(12) United States Patent
Iwasaki et al.

(10) Patent No.: US 6,325,611 B1
(45) Date of Patent: Dec. 4, 2001

(54) NON-AQUEOUS SECONDARY CELL

(75) Inventors: Minako Iwasaki, Osaka; Hayato Higuchi, Settsu; Hiroki Ishikawa, Kyoto-fu; Koji Murakami; Fusaji Kita, both of Ibaraki; Kazunobu Matsumoto, Osaka-fu, all of (JP)

(73) Assignee: Hitachi Maxell, Ltd., Osaka-fu (JP)

( * ) Notice: Subject to any disclaimer, the term of this patent is extended or adjusted under 35 U.S.C. 154(b) by 0 days.

(21) Appl. No.: 09/349,467

(22) Filed: Jul. 9, 1999

(30) Foreign Application Priority Data

Jul. 10, 1998 (JP) .................................................. 10-195422
May 17, 1999 (JP) .................................................. 11-135489

(51) Int. Cl.[7] .................................................. H01M 10/14
(52) U.S. Cl. ...................................... 425/164; 429/231.95
(58) Field of Search .............................. 429/94, 127, 164, 429/236, 231.95, 623.3; 29/623.3

(56) References Cited

U.S. PATENT DOCUMENTS

| | | | |
|---|---|---|---|
| 5,989,743 | * 11/1999 | Yamashita ............................ | 429/129 |
| 6,001,139 | * 12/1999 | Asanuma et al. .................... | 29/623.3 |
| 6,048,372 | * 4/2000 | Mangahara et al. ................. | 29/623.5 |
| 6,051,333 | * 4/2000 | Nagai et al. .......................... | 429/94 |
| 6,106,975 | * 8/2000 | Watanabe et al. .................... | 429/211 |

* cited by examiner

Primary Examiner—Gabrielle Brouillette
Assistant Examiner—M. Wills
(74) Attorney, Agent, or Firm—Birch, Stewart, Kolasch & Birch, LLP

(57) ABSTRACT

A non-aqueous secondary cell comprising a wound structure, in which a positive electrode having a positive collector carrying positive active material on both sides at least at a part of the collector and a negative electrode having a negative collector carrying a negative active material on both sides at least at a part of the collector are wound with inserting a separator inbetween, and a cell can for holding said electrodes, in which the electrode, which faces the can, consists of either electrode material, the outer side of the positive collector at least in the outermost part of the positive electrode has no coating film containing a positive active material, said outer most part of the positive collector faces the negative electrode or the inner wall of the cell can through the separator, and a lead member which is welded to the negative collector does not directly face the positive electrode through the separator.

20 Claims, 11 Drawing Sheets

NON-AQUEOUS SECONDARY CELL

BACKGROUND OF THE INVENTION

1. Field of the Invention

The present invention relates to a non-aqueous cell. In particular, the present invention relates to a non-aqueous cell having a specific structure which can maintain safety while increasing capacity.

2. Prior Art

Non-aqueous secondary cells, typical examples of which are lithium ion secondary cells, comprise organic solvents as major solvents of electrolytes, and they have a large capacity, generate a high voltage and a high output, and achieve a high energy density. Thus, demands for non-aqueous secondary cells have increased.

Nowadays, lithium ion secondary cells, which comprise $LiCoO_2$ as a positive electrode active material and a carbonaceous material as a negative electrode active material, are commercialized. Different from conventional non-aqueous secondary cells which use a lithium metal as a negative electrode, to increase a capacity, such lithium ion secondary cells comprise positive and negative electrodes, which are formed by applying the pastes of the above active materials dispersed in organic solvents together with binders onto the both surfaces of positive and negative electrode collectors, respectively, to form coating films containing the respective active materials. The band-form electrodes are spirally wound with insertion of a separator between them, and the wound electrode member is installed in a cell can to assemble a cell.

Non-aqueous secondary cells use, as a major solvent of electrolytes, mixtures of cyclic esters (e.g. ethylene carbonate, etc.) and esters (e.g. dimethyl carbonate, methyl propionate, etc.), all of which are flammable solvents. Thus, cells are very carefully designed to provide good safety of the cells. Thus, conventional non-aqueous cells have an interruption vent in a sealing plate to prevent the explosion of cell cans caused by the generation of gasses, a PTC device in a cell can to prevent heat generation due to the flow of an over-current, or a shutdown mechanism which prevents the migration of lithium ions by clogging micropores of separators by the fusion of the micropores at high temperatures.

However, it has been found by the study of the present inventors that non-aqueous cells may not have sufficient safety when a cell capacity should be further increased or when the cells should follow various specifications presented by users, unless the structure of a power-generating element is improved. That is, it has been found that conventional non-aqueous cells tend to exhibit insufficient safety in safety tests under severe conditions such as a crush test, a nail penetration test, or an external short-circuiting test, all of which intentionally simulate the abnormal use of cells.

For example, a crush test simulates a situation such that a cell is accidentally crushed. It has been revealed in the crush test that a cell is easily short-circuited when a lead member, which is welded to a negative electrode collector, faces a positive electrode through a separator. A reason for such a result may be that the lead member for a negative electrode breaks a separator when a cell is broken by pressing. When one electrode is in contact with a cell can which functions as a terminal for the other electrode in the course of a crush test, a short circuit current flows, and thus the amount of generated heat increases, if a coating film containing an active material with a high resistance is present. When a separator surrounding an electrode member melts by such heat, other parts of a positive electrode maybe in contact with the cell can, and thus a secondary internal short-circuiting may form. Furthermore, in the case of a non-aqueous secondary cell having an electrode which comprises a coating film containing an active material on a collector, foreign materials such as metal pieces from the production processes are often present in cells, or the active material often drops when an electrode member is installed in a cell can. In general, a positive electrode and a negative electrode are separated with a separator. Thus, such foreign materials rarely form short-circuits. However, when the size of foreign materials is large, so-called minute short circuits (soft short) form in a crush test, if such foreign materials are present in a cell can, and may finally trigger the formation of internal short circuits.

A nail penetration test can surely form a short circuit in a smaller region than the crushing of a cell or an external short-circuiting. Thus, a current concentrates at the short-circuited region, and thus such a region is more easily heated so that the cell is partly heated to a high temperature quickly. Therefore, a separator tends to be unevenly fused (clogging by fusing). In addition, an amount of heat, which is generated by the reaction of an electrolyte and a negative electrode in the short-circuited region, increases. Accordingly, the nail penetration test is a very severe safety test which can find the lack of safety that would not happen under normal service conditions. Thus, it is supposed that cells can maintain safety in the case of abnormal use, when the safety of cells is confirmed by a nail penetration test.

A nail penetration test at a high temperature of 45° C. can heat a cell to a higher temperature and more easily causes a thermal runaway reaction in a cell than a nail penetration test at a room temperature. Furthermore, when a nail is halfway penetrated, for example, a half of a nail is penetrated, a short-circuited region is small and thus a current is further concentrated to easily generate heat. Consequently, a nail penetration test at 45° C. with piercing a half of a nail into a cell is a very severe test to check the safety of a cell. It is believed that cells have sufficient safety in practical use, once the safety of cells is approved by a safety test under such severe conditions.

In addition, non-aqueous cells are subjected to a comprehensive external short-circuiting test, in which a cell is charged to 4.2 V or larger, and then positive and negative electrodes are connected, to confirm the high safety of the cells. With the increase of the energy level of cells, a larger current flows through a cell on external short-circuiting. Thus, a separator, which is in contact with a part having a relatively high resistance in a cell, is melted, so that secondary internal short circuits are induced, and the cell tends to be partly heated to a high temperature quickly. Like in the above crush test, when a separator between a wound electrode member and a cell can is melted, one electrode and the inner wall of a cell can which functions as the other electrode are brought into contact with each other to form a short circuit. Furthermore, when foreign materials, which have a high resistance, are present in a cell can, minute short circuits grow to short circuits. As a result, heat may be locally generated in regions in which short circuits form. Thus, it is believed that cells can maintain safety when they meet with abnormal use, once the safety of cells is approved by an external short-circuiting test.

An external short-circuiting test at a high temperature of 45° C. can heat a cell to a higher temperature and more easily causes a thermal runaway reaction in a cell than an external short-circuiting test at a room temperature.

Consequently, an external short-circuiting test at 45° C. is a very severe test to check the safety of a cell, and it is believed that cells have sufficient safety in practical use, once the safety of cells is approved by a safety test under such severe conditions.

The energy density of a cell is further increased with the recent trend of the increase of a capacity. Thus, it is necessary for a cell to have excellent safety in a crush test, a nail penetration test and also an external short-circuiting test, all of which are safety tests under severe conditions. To this end, the internal structure of a cell should be modified to a structure which can hardly ignite.

SUMMARY OF THE INVENTION

One object of the present invention is to provide a highly safe non-aqueous secondary cell having an improved structure, which can deal with the future increase of capacity, and has sufficient safety that is confirmed by a crush test, a nail penetration test and also an external short-circuiting test, all of which are safety tests under severe conditions.

The above object is achieved by a non-aqueous secondary cell comprising an electrode member having a wound structure, in which a positive electrode having a positive electrode collector which carries coating films containing a positive electrode active material on both sides at least at a part of the collector and a negative electrode having a negative electrode collector which carries coating films containing a negative electrode active material on both sides at least at a part of the collector are wound with inserting a separator between the electrodes, and a cell can in which the electrode member is placed, wherein the electrode of the electrode member, which faces the cell can, substantially consists of either the positive electrode or the negative electrode, the outer side of the positive electrode collector at least in the outermost part of the positive electrode in the electrode member has no coating film containing a positive electrode active material, the outer side of the positive electrode collector having no coating film containing a positive electrode active material faces the negative electrode or the inner wall of the cell can through the separator, and a lead member which is welded to the negative electrode collector does not directly face the positive electrode through the separator.

The non-aqueous secondary cell of the present invention can show excellent safety in a crush test, a nail penetration test and also an external short-circuiting test, although it has a large capacity.

BRIEF DESCRIPTION OF THE DRAWINGS

FIG. 9 schematically shows the structure of a cell of Example 4.

DETAILED DESCRIPTION OF THE INVENTION

Figure 1:
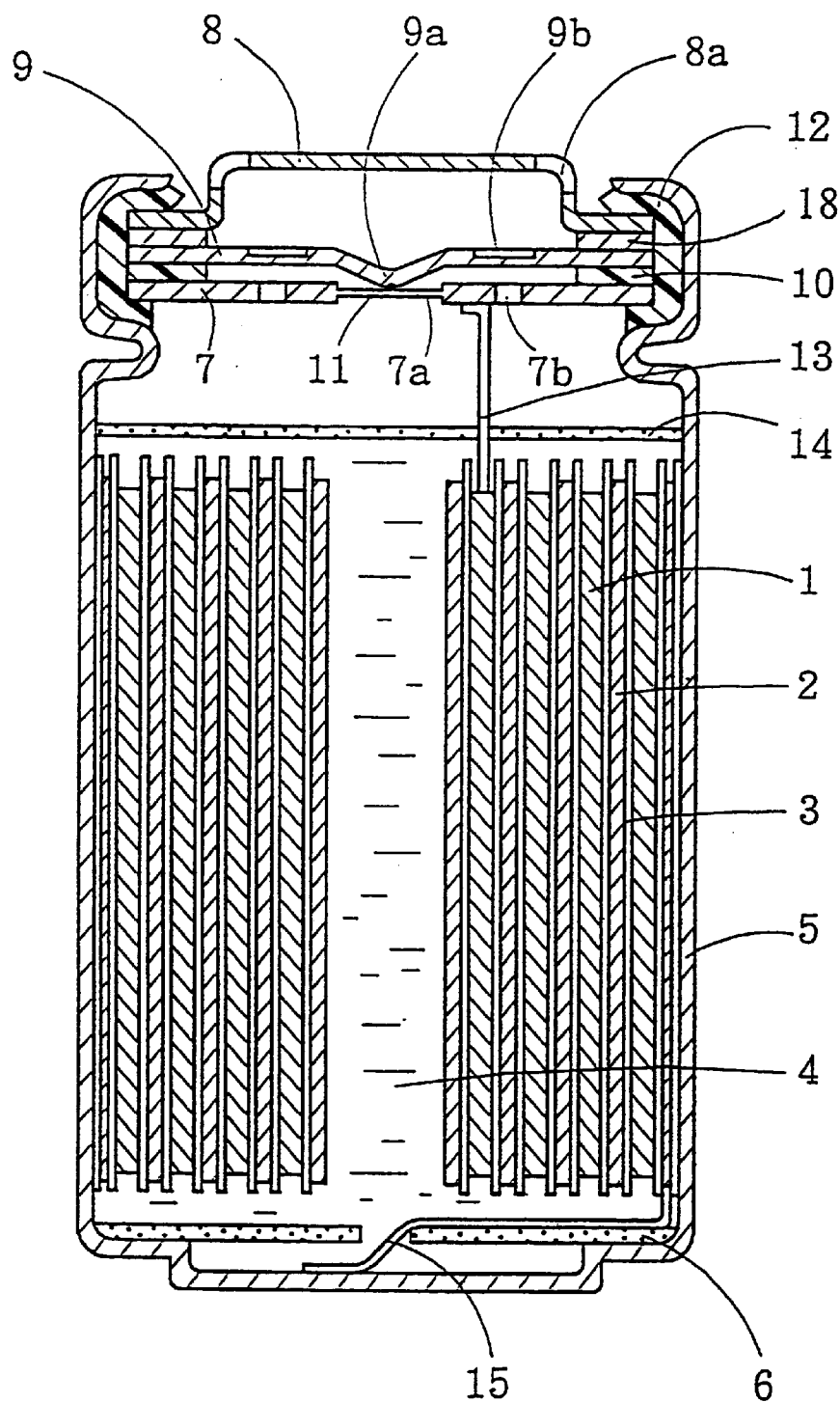
FIG. 1 is a vertical cross section which schematically shows the structure of a non-aqueous secondary cell produced in Example 1 according to the present invention.

Here, the development of the present invention and a reason why the high safety of cells can be maintained while increasing the capacity by the adoption of the above structure will be explained.

One of the most common wound structures of electrode members used in non-aqueous secondary cells such as lithium ion secondary cells is as follows:

To increase the capacity of cells by the increase of capacity per a unit volume, a band-form positive electrode having a positive electrode collector made of, for example, an aluminum foil, which carries coating films containing a positive electrode active material on both sides at least at a part of the collector, a negative electrode having a negative electrode collector made of, for example, a copper foil, which carries coating films containing a negative electrode active material on both sides at least at a part of the collector, and two separator are laminated in the order of a separator, a negative electrode, a separator and a positive electrode and spirally wound so that the negative electrode forms an outer turn in relation to the positive electrode.

Thus, the present inventors purchased lithium ion secondary cells which comprise an electrode member having the above-described wound structure and are most widely spread, and carried out a crush test, a nail penetration test and an external short-circuiting test on such cells. It was found that commercial lithium ion secondary cells are less dangerous, but the further increase of the energy density of those lithium ion secondary cells increases the danger of the cells. That is, it has been found that, since the negative electrodes of those cells comprise a compound with which lithium ions are doped and dedoped, for example, a carbonaceous material, an exothermic reaction takes place from about 100° C. between deposited lithium and a carbonaceous material containing the doped lithium, if a negative electrode is over-charged and a small amount of metal lithium is electrically deposited.

In addition, lithium metal drops off from a positive electrode and the initiation temperature of a reaction with an electrolyte is lowered. Thus, heat may be generated from about 100° C. When a temperature further rises and reaches a thermal runaway reaction temperature on a positive electrode, a cell abnormally generates heat. Because of such an exothermic phenomenon associated with a chain reaction, the safety of a charged cell decreases when the chargeable-dischargeable capacity of a cell at a full charge exceeds 130 mAh/cm$^3$ per a unit volume of a wound electrode member.

Herein, the volume of a wound electrode member means the bulk volume of positive and negative electrodes and a separator which are wound, in a cell, and does not include the volume of an aperture which remains after the removal of a core, that is used to spirally wind the positive and negative electrodes and the separator. In brief, the volume of a wound electrode member is equal to the total volume of positive and negative electrodes and a separator. These three elements are very important in determining the capacity of a cell. Irrespective of the sizes of cells, the capacity densities of cells can be compared by calculating a discharge capacity per a unit volume of a wound electrode member (discharge capacity/volume of wound electrode member).

A discharge capacity herein used means a discharge capacity when a specific cell is charged and discharged under standard service conditions. A chargeable-dischargeable capacity at a full charge can be obtained by the measurement of a discharge capacity under standard service conditions. When no standard service conditions are provided, a capacity is calculated by charging a cell at 25° C., at 1 C (a current at which a cell is discharged in one hour) up to 4.2 V, charging the cell at a constant voltage after reaching 4.2 V, finishing the charge after 2.5 hours, and discharging the cell at 0.2 C to 2.75 V.

That is, as a discharge capacity per the unit volume of a wound electrode member increases, the amount of generated heat per a unit volume increases, when a cell is overcharged to generate heat, and a possibility of the rise of a cell temperature up to the thermal runaway temperature of a positive electrode increases. Accordingly, it is necessary to control the heat generation so that a cell temperature do not rise to the thermal runaway temperature of a positive electrode, in the case of a cell having a large discharge capacity per a unit volume. It is difficult to dissipate heat from a wound electrode member having a large volume. When the volume of a wound electrode member is large, for example, at least 10 cm$^3$, in particular, at least 11 cm$^3$, the present invention can maintain the safety of a cell, and remarkably exhibits its effects and achieves favorable results.

In the present invention, the outer side of a positive electrode collector at least in the outermost turn of the positive electrode of a wound electrode member carries no coating film containing a positive electrode active material to leave the exposed surface of the positive electrode collector, thus the outer side of the positive electrode collector carrying no coating film containing a positive electrode active material faces the negative electrode or the inner wall of the cell can through the separator, and a lead member which is welded to the negative electrode collector does not directly face the positive electrode through the separator. A reason why such structures can improve the safety of a cell is assumed as follows:

As described above, the use of a compound with which lithium ions are doped and dedoped, for example, a carbonaceous material, as a negative electrode makes the reactivity of the negative electrode with an electrolyte lower than a negative electrode made of metal lithium. However, a positive electrode collector carries the coating films containing a positive electrode active material on both sides at least at apart of the collector. Thus, as the chargeable-dischargeable capacity of a positive electrode increases, the reactivity of a positive electrode with an electrolyte increases. Accordingly, the amount of generated heat increases and, in turn, the temperature of the cell tends to rise. When the outer side of a positive electrode collector at least in the outermost part of the positive electrode of a wound electrode member has no coating film containing a positive electrode active material, and the outer side of the positive electrode collector having no coating film containing a positive electrode active material faces a negative electrode or the inner wall of a cell can through a separator, the locally generated heat in the cell is dissipated, thus heat radiation is accelerated, and the positive electrode hardly reaches the thermal runaway temperature so that the cell does not abnormally generate heat, in comparison with a cell having the coating film containing a positive electrode active material on such an outer side of the positive electrode collector, when the cell is penetrated with a nail in a nail penetration test. Consequently, the safety of the cell improves. In short, since the firstly short-circuited area in the outermost part has no charged positive electrode active material in the above structures, the cell temperature hardly reaches a thermal runaway temperature, even if heat is generated. The secondly short-circuited area from the outermost part of an electrode member has a charged positive electrode active material, but a current flows through the firstly and secondly short-circuited areas. Thus, the amount of a current flowing the secondly short-circuited area is no more than a half of the initial current amount. Accordingly, the temperature increase of the charged positive electrode active material is suppressed, and thus the temperature hardly reaches a thermal runaway temperature.

In a crush test, a lead member, which is welded to an electrode, forms a convex part on an electrode. Thus, a large stress tends to be concentrated on this part, and a torsional stress tends to generate in an electrode member. When a cell is assembled by pouring an electrode in a cell can and closing the opening of the can and then charged, an electrode member expands due to the swelling of electrode active materials, in particular, a negative electrode active material. Thus, the concentrated stress or the torsional stress further increases so that the electrode member deforms. In such a case, a lead member, which is welded to a negative electrode collector, is strongly pressed against a separator. Since a lead member is made of a metal material harder than a coating film containing a negative electrode active material, it easily breaks a separator, when the wound electrode member is collapsed on crushing. Accordingly, internal short-circuiting tends to form.

In a structure having both positive and negative electrodes in the outermost turn of a wound electrode member, a cell can functions as an electrode which is different from one of the electrodes which face the cell can. When a separator between the electrode member and the inner wall of the cell can is melt, the cell can and the different electrode are brought into contact with each other, and thus a short circuit forms. When a separator surrounding an electrode member is melted by the heat generation due to a short circuit, the positive electrode in another area is brought into contact with the cell can. Thus, there is the danger of the formation of secondary internal short circuits. Furthermore, when foreign materials penetrate a space between a wound electrode member and the inner wall of a cell can, they tend to form minute short circuits, since the electrodes form a continuity. Thus, such minute short circuits may induce internal short circuits in a crush test.

In general, a lead member for a negative electrode and coating films containing electrode active materials have high resistance. Thus, a coating film containing a positive electrode active material, which faces a lead member for a negative electrode, facilitates the heat generation inside the cell by the Joule's heat, and also prevent the heat radiation, when a large current flows due to internal short circuits, which are formed by the breakage of a separator with the lead member in a crush test. Accordingly, the positive electrode easily reaches a thermal runaway temperature at a relatively early stage. Furthermore, when a large current forcedly flows in a nail penetration test, it is concentrated at a lead member, so that the lead member is locally heated to a high temperature and, in turn, a separator in contact with the lead member is softened and melts. Thus, the lead member can easily break the separator.

An external short-circuiting test can confirm that a cell has high safety by connecting a positive electrode and a negative electrode to form an external short circuit between them, by the application of an extraordinarily high charge voltage, which is not encountered in usual service. When a cell is in a charging state at such a high voltage, a separator near a lead member for a negative electrode is melted in a parabolic form around the lead member from its outer side, by the heat generation due to the resistance of the lead member. That is, when a large current flows through a wound electrode member having a lead member which is provided on the outermost part of a negative electrode because of an external short circuit, firstly a separator provided on the outer side of the lead member for the negative electrode vigorously melts, and then a separator on the inner side of the lead member for the negative electrode melts. In particular, the separator on the inner side of the lead member is melt and broken in the second and third turns inside of the wound electrode member, in proportion to the increase of the energy density of the cell. When a part of a separator, which is present in an area where a coating film containing a positive electrode active material and one containing a negative electrode active material face each other, is melted and broken, an internal short circuit forms by the formation of a contact between those coating films, and thus the cell abnormally generates heat. When such a secondary internal short circuit forms in an external short-circuiting test, a coating film containing a positive electrode active material, which faces a lead member for a negative electrode, facilitates the heat generation inside the cell by the Joule's heat, and also prevent the heat radiation, since a large current flows, like in a crush test. Accordingly, an positive electrode easily reaches a thermal runaway temperature in a relatively early stage. Like in a crush test, when both positive and negative electrodes are present in the outermost turn of a wound electrode member, a cell can and an electrode facing the cell can are brought into contact with each other to form a short circuit, when a separator on the outer side of a lead member for a negative electrode melts and finally a part of a separator between the cell can and the electrode melts. Furthermore, when foreign materials, in particular, those having high resistance, penetrate a space between a wound electrode member and the inner wall of a cell can, a current is concentrated at a short-circuited area, so that local heat generation increases.

The cell of the present invention constructs the electrode of a wound electrode member facing a cell can substantially from a single electrode of either a positive electrode or a negative electrode, and a lead member for a negative electrode does not directly face a positive electrode through a separator. Accordingly, the possibility of the formation of a short circuit is reduced even in the outermost part of the electrode member in which an internal short circuit easily forms, and local heat generation caused by foreign materials is prevented. In addition, when the cell of the present invention is forcibly broken by a crush test, an internal short circuit is hardly formed by the lead member. Even when a large current flows through the lead member for the negative electrode to generate heat in an external short-circuiting test, the melting of a separator is prevented, and thus the heat generation is suppressed.

The present invention will be explained more in detail.

Figure 2:
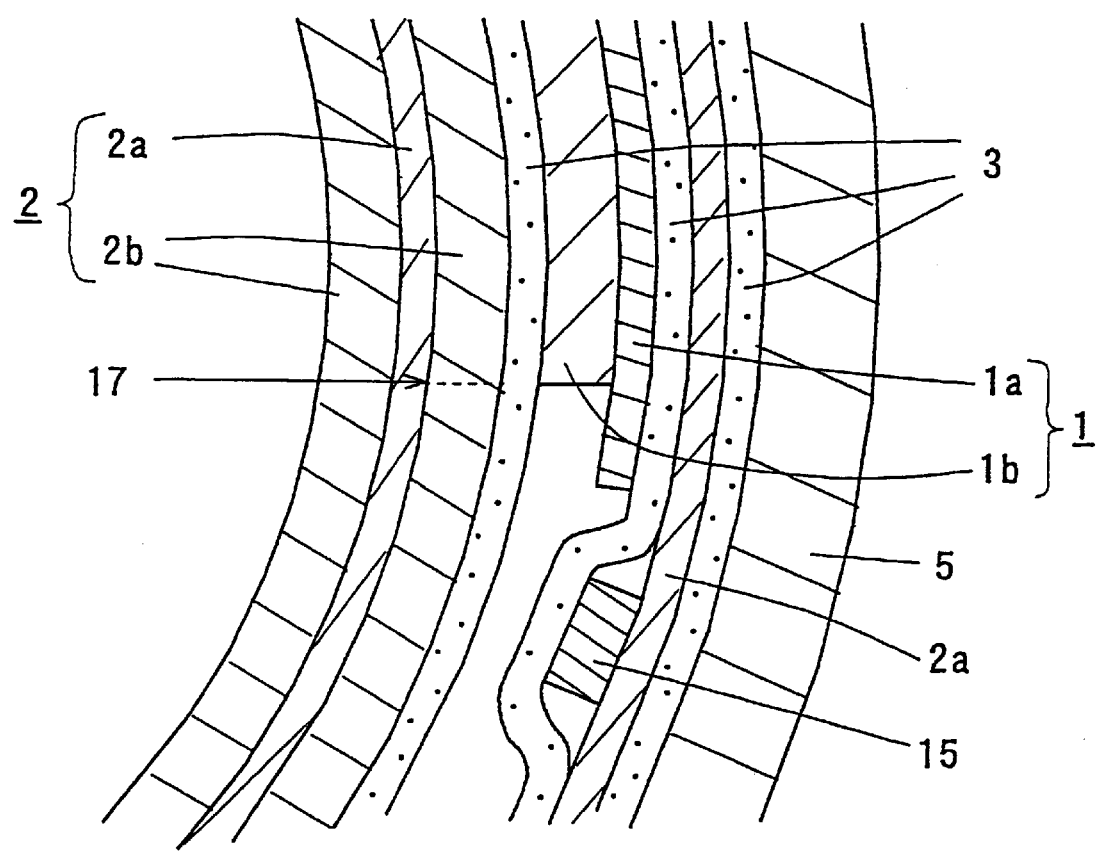
FIG. 2 is an enlarged cross section which shows the outermost part and neighboring parts of an electrode member having a wound structure used in a cell of Example 1.

According to the embodiment (i) of the present invention, as shown in FIG. 2, the coating film 1b containing a positive electrode active material is not formed on the outer side of a positive electrode collector 1a in the outermost turn of a positive electrode, while the coating film 1b containing a positive electrode active material is formed only on the inner side of the positive electrode collector 1a. Although not shown in FIG. 2, a positive electrode in the second and subsequent turns to the outermost turn carries coating films 1b containing a positive electrode active material on the both sides of a positive electrode collector 1a.

Furthermore, the electrode of a wound electrode member, which faces a cell can 5, substantially consists of a negative electrode 2. FIG. 2 shows only an area near a lead member to avoid the excessive enlargement of a drawing. FIG. 2 illustrates the outermost and next turns of the negative electrode 2. The negative electrode in the outermost turn consists of a negative electrode collector 2a only, and carries no coating film containing a negative electrode active material on either side, while in the next turn to the outermost turn, the negative electrode collector 2a carries coating films 2b containing a negative electrode active material on both sides.

A separator 3 is inserted not only between the positive electrode 1 and the negative electrode 2 but also between the negative electrode collector 2a in the outermost turn of a wound electrode member and the cell can 5, which functions as a negative electrode in this embodiment. FIG. 2 and the subsequent figures schematically show a wound electrode member, and the dimensional ratios of elements may not be accurate. This is because an element having a very thin actual thickness is drawn as if it has a certain thickness. Accordingly, a gap is present at a position which actually has no gap, and vice versa. Furthermore, an actually small gap may be drawn as a large gap.

In the wound electrode member of the above embodiment (i), as shown in FIG. 2, the electrode of the electrode member facing the cell can 5 substantially consists of the negative electrode 2, the outer side of the positive electrode collector 1a in the outermost turn of the positive electrode 1 carries no coating film 1a containing a positive electrode active material so that the exposed par of the positive electrode collector 1a directly faces the exposed part of the negative electrode collector 2a of the negative electrode 2 through the separator 3, and the lead member 15 welded to the negative electrode collector 2a of the negative electrode 2 faces the coating film 2b containing a negative electrode active material of the negative electrode 2 in the next turn to the outermost turn through the separator 3, but does not directly face the positive electrode 1.

Accordingly, in the case of a cell comprising such a wound electrode member, even if a chargeable-dischargeable capacity at a full charge is increased to 130 mAh/cm$^3$ or larger per a unit volume of a wound electrode member, locally generated heat is dissipated so that the temperature hardly reaches the thermal runaway temperature of a positive electrode in a nail penetration test in which a nail is penetrated through an area where the collectors of negative and positive electrodes face each other through a separator in the outermost turn of the electrode member. Thus, a cell does not abnormally generate heat, and the safety of the cell can be improved.

Also in a crush test, less stress is applied to the lead member 15 for the negative electrode 2. Thus, the formation of an internal short circuit is prevented in the course of the crush test. Even when the cell is crushed, the lead member 15 for the negative electrode 2 is brought into contact with the negative electrode in the second turn to the outermost turn. Thus, the formation of an internal short circuit is prevented. In addition, the electrode of the wound electrode member, which faces the cell can 5, substantially consists of the negative electrode 2, the positive electrode 1 and the cell can 5 functioning as a negative electrode terminal face each other through the negative electrode 2. Therefore, even when the separator 3, which is interposed between the cell can 5 and the electrode member is melt or broken in a crush test or an external short-circuiting test, no internal short circuit is formed by the contact of the positive electrode 1 with the cell can 5, and a minute short circuit due to foreign materials between the cell can 5 and the electrode member is hardly formed. Thus, the possibility of the growth of the minute short circuit to the internal short circuit can be decreased in the crush test. Furthermore, in an external short-circuiting test, since no positive electrode 1 is included in the electrode facing the cell can 5, the formation of a continuity is prevented, and thus the local heat generation is prevented. Finally, even when a large current flows through a lead member so that the lead member generates heat and melts the separator 3 in a nail penetration test, a crush test and an external short-circuiting test, the formation of an internal short circuit is prevented since the lead member 15 does not face the positive electrode 1.

In particular, when the cross sectional shape of a wound electrode member is of ellipsoid or oval, a torsional or distortional stress is easily exerted onto the convex part of the lead member 15, and thus a stress applied to the separator which is in contact with the lead member 15 increases, and the separator 3 is more easily melt when the lead member 15 generates heat. According to the present invention, the safety of a cell can be maintained even in such a situation. Therefore, the effects of the present invention are remarkable, when the present invention is applied to such a cell having an ellipsoidal electrode member.

According to the present invention, the single electrode of an electrode member faces the cell can 5, and such a single electrode is substantially the positive electrode 1 or the negative electrode. A reason for this is as follows:

It is preferable to constitute more than the outermost turn of a wound electrode member, which faces the cell can 5, from either a positive electrode or a negative electrode as a single electrode. However, the formation of an internal short circuit can sufficiently be prevented when the outermost turn of the electrode member substantially consists of a single electrode, even if the electrode member has some displacement depending on the mechanical accuracy of a winding method or a winding machine. An electrode used in the above may consists of an electrode collector carrying no coating film containing an active material.

The outermost turn of an electrode member is preferably then exactly outermost turn of an electrode, but may be shorter than the exact one turn insofar as the possibility of the formation of an internal short circuit can be decreased, as explained below in connection with the embodiment (ii).

In addition to the use of the above wound electrode member, it is preferable that, in the longitudinal direction of the wound electrode member, the coating film 1b containing a positive electrode active material of the positive electrode 1 always faces the coating film 2b containing a negative electrode active material of the negative electrode 2 through the separator 3, and at least one turn of the positive electrode 1 carries no coating film containing a positive electrode active material on the outer side in the outermost part. That is, when at least one turn of the positive electrode has no coating film containing a positive electrode active material in the outermost part of the positive electrode 1, the possibility of abnormal heat generation can be decreased even when any part of the electrode member is penetrated with a nail.

When the above wound electrode member is used according to the present invention, preferably the thickness of the lead member 15, which is welded to the negative electrode collector 2a, is smaller than the total of the thickness of the negative electrode 2 facing the lead member 15 and three times of the thickness of the separator 3 [(negative electrode thickness)+(separator thickness)×3]. When the above thickness relationship is satisfied, it is possible to suppress the formation of an internal short circuit, even if the lead member 15 breaks the negative electrode in the second turn to the outermost turn as the crushing proceeds, and then the negative electrode is brought into contact with the positive electrode in the next turn, in a crush test which presses the lead member for the negative electrode 2 inwardly.

As can be understood from the above explanation, the thickness of a negative electrode herein used means that of an inner negative electrode which faces the lead member for the negative electrode, from the viewpoint of the prevention of the formation of an internal short circuit, which is caused by the breakage of the facing negative electrode 2 with the lead member 15 for the negative electrode.

In the present invention, a distance between the lead member 15 for the negative electrode 2 and the position 17, at which the overlapping of the coating film 1b containing the positive electrode active material and the coating film 2b containing a negative electrode material starts in the outermost part of an electrode member, (the distance of the most closely neighbored coating films) is preferably one sixth (⅙) to a half (½) of one turn of the negative electrode in the outermost turn of the electrode member.

As already explained, in an external short-circuiting test, as the energy density of a cell increases, a separator positioned inside the lead member 15 for the negative electrode 2 is melt and broken in the two or three inner turns of a wound electrode member, while the separator 3 near the lead member 15 for the negative electrode 2 in the outermost turn is melt in a parabolic form around the lead member. Accordingly, the lead member 15 for the negative electrode 2 should be placed at a certain distance from the position 17, at which the overlapping of the coating film 1b containing the positive electrode active material and the coating film 2b containing a negative electrode material starts. Otherwise, a secondary internal short circuit may be induced, when a cell is externally short-circuited.

According to the study by the present inventors, it has been found that the lead member 15 for the negative electrode 2 is preferably separated by at least one sixth (⅙), preferably at least one fifth (⅕) of one turn, and not larger than a half turn of the negative electrode 2 in the outermost turn, from the position 17, at which the overlapping of the coating film 1b containing the positive electrode active material and the coating film 2b containing a negative electrode material starts.

When the above wound electrode member is used in the cell of the present invention, neither sides of the negative electrode collector 2a in the outermost turn preferably carry a coating film containing a negative electrode active material as shown in FIG. 2, so that heat radiation can be facilitated in the outermost turn of the negative electrode 2.

As shown in FIG. 2, the outer side of the positive electrode collector 1a carries no coating film containing a positive electrode material, and only the inner side of the positive electrode collector 1a carries the coating film 1b containing a positive electrode material, in the outermost turn of the positive electrode. Accordingly, it is possible to neglect the thicknesses of a coating film containing a positive electrode active material and a coating film containing a negative electrode active material which will not be charged or discharged, and thus the interior space of a cell can is effectively used, and the capacity of a cell can be further increased. The safety of a cell having a large capacity can greatly be improved by the application of the present invention.

Figure 7:
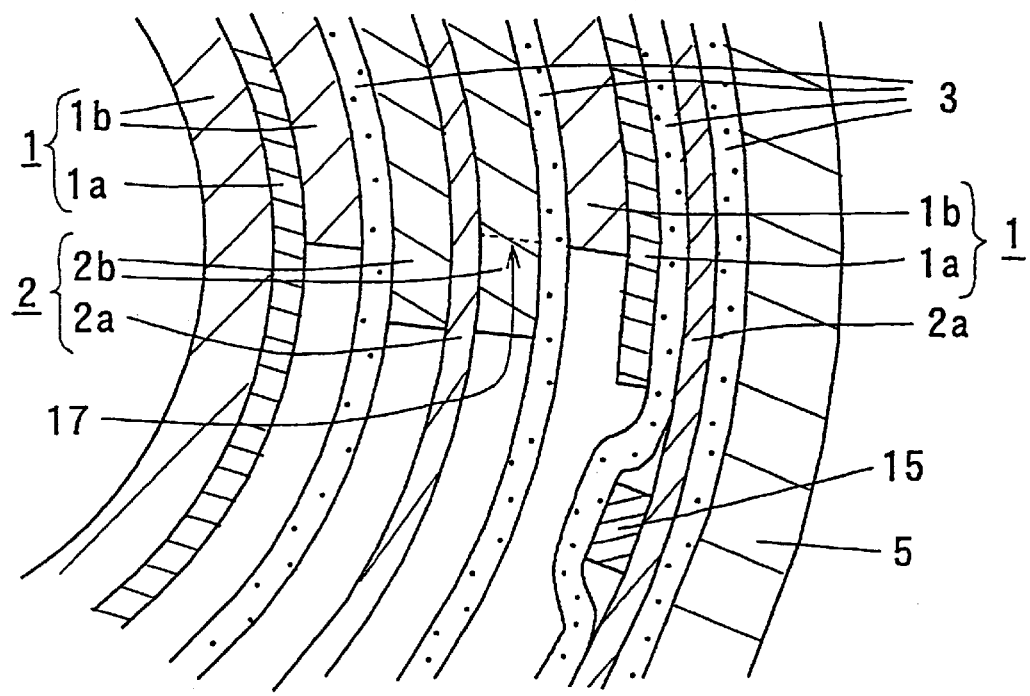
FIG. 7 is an enlarged cross section which shows the outermost part and neighboring parts of an electrode member having a wound structure used in a cell of Example 6.

In the embodiment (ii) of a wound electrode member, which is shown in FIG. 7, substantially more than one turn of the negative electrode collector 2a carry no coating film containing a negative electrode active material on both sides in the outermost part of the negative electrode, and substantially more than one turn of the positive electrode collector 1a carry no coating film containing a positive electrode active material on the outer side in the outermost part of the positive electrode, so that the possibility of the formation of an internal short circuit is further decreased.

In the embodiment (ii), as shown in FIG. 7, more than one turn of the electrode of the wound electrode member, which faces the cell can 5, substantially consists of the negative electrode 2. FIG. 7 shows the outermost turn and the next turn of the negative electrode 2, and more than one turn of the negative electrode 2 consists of the negative electrode collector 2a, which carries no coating film containing a negative electrode active material on both sides, while the second and subsequent turns of the negative electrode collector 2a carries coating films 2b containing a negative electrode active material on both sides. FIG. 7 also shows the outermost turn and the next turn of the positive electrode 1, and the positive electrode 1 carries no coating film containing a positive electrode active material on its outer side so that the surface of the positive electrode collector 1a is exposed in at least one turn. The exposed surface of the positive electrode collector 1a faces the exposed surface of the negative electrode collector 2a of the negative electrode 2 through the separator 3. The lead member 15, which is welded to the negative electrode collector 2a of the negative electrode 2, faces the negative electrode collector 2a in the next turn to the outermost turn through the separator 3 but does not directly face the positive electrode 1, like in the embodiment (i).

A cell comprising the above-described wound electrode member can achieve the effects, which can be attained by constructing the electrode of a wound electrode member facing a cell substantially from a single electrode of either a positive electrode or a negative electrode, and avoiding the direct facing of a lead member for a negative electrode to a positive electrode through a separator, like the embodiment (i). Furthermore, the generation of heat due to the formation of an internal short circuit can be further suppressed, since the active materials of positive and negative electrodes having high resistance do not face each other in one or more turns in the outermost part, and thus a short circuit is formed between the negative electrode collector 2a and the positive electrode collector 1a both having low resistance, at any part. In addition, if foreign materials are present in a space between the outermost part of an electrode member and the inner wall of a cell can, and a minute short circuit is formed, the possibility of the growth of the minute short circuit to a short circuit can be decreased, since the positive and negative collectors having low resistance are brought into contact with each other. Even if positive and negative collectors are short-circuited, the metal collectors are brought into contact with each other, and thus the high thermal conductivity of the collectors facilitates the heat radiation. Accordingly, the cell does not abnormally generate heat in the whole outermost part.

The embodiment (ii) has been explained by making reference to the example in which a negative electrode is the electrode of a wound electrode member facing the cell can 5. In a wound electrode member, the positions of positive and negative electrodes can be reversed, like in the embodiment (v) which will be explained below. That is, the positive electrode is used as the electrode of a wound electrode member facing a cell can, more than one turn of the positive electrode 1 consists of the positive electrode collector 1a, which carries no coating film containing a positive electrode active material on both sides, and the negative electrode 21 carries no coating film containing a negative electrode active material on its outer side in at least one turn in the outermost part. Such a structure can also contribute to the suppression of the formation of an internal short circuit.

Figure 6:
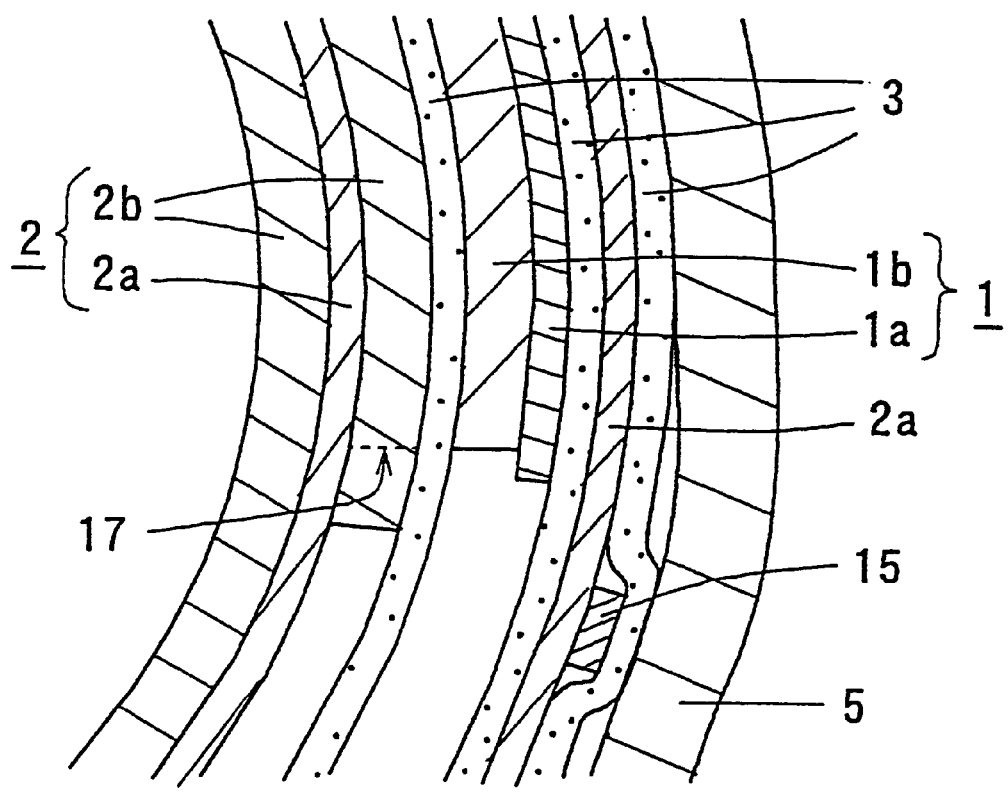
FIG. 6 is an enlarged cross section which shows the outermost part and neighboring parts of an electrode member having a wound structure used in a cell of Example 5.

In the embodiment (iii) of the present invention, which is shown in FIG. 6, the lead member 15 is positioned on the outer side of the negative electrode 2 in the outermost turn, unlike the embodiment (i) in which the lead member 15 is positioned on the inner side of the negative electrode 2 in the outermost turn. In the outermost turn of this wound electrode member, the positive electrode collector 1a carries a coating film 1a containing a positive electrode active material on its inner side, but no coating film containing a positive electrode material on its outer side.

FIG. 6 shows the outermost turn and the next turn of the negative electrode 2, and the outermost turn of the negative electrode 2 consists of the negative electrode collector 2a, which carries no coating film containing a negative electrode active material on both sides, while the next turn of the negative electrode collector 2a carries coating films 2b containing a negative electrode active material on both sides. The lead member 15 for the negative electrode 2 is positioned on the outer side of the terminal part of the negative electrode collector in the outermost turn. The separator 3 is inserted not only between the positive electrode 1 and the negative electrode 2 but also between the negative electrode collector 2a in the outermost turn of the wound electrode member and the inner wall of a cell can 5 (a negative electrode can in this embodiment).

In this embodiment of a wound electrode member, as shown in FIG. 6, the electrode of a wound electrode member facing the cell can substantially consists of the negative electrode 2, the positive electrode collector 1a carries a coating film 1a containing a positive electrode active material on its inner side, but no coating film containing a positive electrode material on its outer side, in the outermost turn of the positive electrode 1, the exposed surface of the positive electrode collector 1a carrying no coating film containing a positive electrode active material faces the exposed surface of the negative electrode collector 2a of the negative electrode 2 carrying no coating film containing a negative electrode active material through the separator 3, and the lead member 15, which is welded to the negative electrode collector 2a of the negative electrode, faces the cell can 5 through the separator 3 but does not directly face the positive electrode 1.

Accordingly, in the case of a cell comprising such a wound electrode member, even if a chargeable-dischargeable capacity at a full charge is increased to 130 mAh/cm$^3$ or larger per a unit volume of a wound electrode member, a locally generated heat is dissipated so that the temperature hardly reaches the thermal runaway temperature of a positive electrode in a nail penetration test in which a nail is penetrated through a cell. Thus, a cell does not abnormally generate heat, and the safety of the cell can be improved.

Also in a crush test, even when a cell is crushed, the lead member 15 for the negative electrode 2 is brought into contact with the cell can 5 as a negative electrode can, since the lead member 15 for the negative electrode 2 faces only the electrode can (a negative electrode can in this embodiment). Thus, the formation of an internal short circuit is prevented. In addition, the electrode of the wound electrode member, which faces the cell can 5, substantially consists of the negative electrode 2, the positive electrode 1 and the cell can 5 functioning as a negative electrode terminal face each other through the negative electrode 2. Therefore, even when a separator 3 near the lead member 15 for the negative electrode facing a cell can is melt or broken in a crush test or an external short-circuiting test, the positive electrode 1 and the cell can 5 are not brought into contact with each other, and a minute short circuit due to foreign materials between the cell can 5 and the electrode member is hardly formed. Thus, the possibility of the growth of the minute short circuit to the internal short circuit can be decreased in the crush test. Furthermore, in an external short-circuiting test, since no positive electrode 1 is included in the electrode facing the cell can 5, the formation of a continuity is prevented, and thus the local heat generation is prevented. Finally, even when a large current flows through the lead member 15 so that the lead member 15 generates heat and melts the separator 3 in a nail penetration test, a crush test and an external short-circuiting test, the formation of an internal short circuit is prevented since the lead member 15 does not directly face the positive electrode 1.

Figure 3:
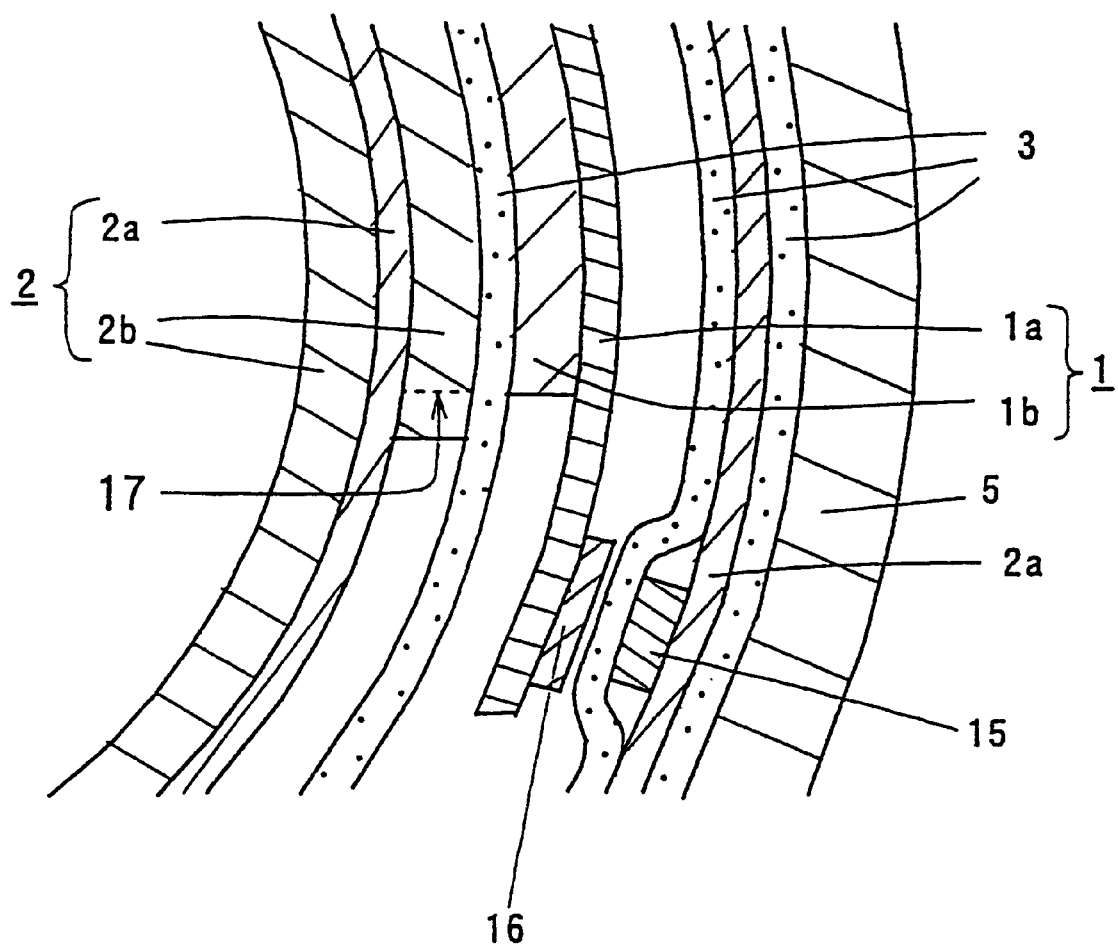
FIG. 3 is an enlarged cross section which shows the outermost part and neighboring parts of an electrode member having a wound structure used in a cell of Example 2.

In the embodiment (iv) of the present invention, which is shown in FIG. 3, the electrode of a wound electrode member facing a cell can substantially consists of a negative electrode 2, and the outer side of the positive electrode in the outermost turn has an uncoated surface, that is, the exposed surface of the positive electrode collector 1a (that is, a surface carrying no coating film containing a positive electrode active material), but the inner side of the positive electrode carries a coating film 1b containing a positive electrode active material. In this embodiment, a positive electrode-insulating tape 16 is applied on the outer side of the terminal part of the positive electrode 1, and such an insulating tape 16 faces the lead member 15, which is welded to the negative electrode collector 2a through the separator 3. Thus, the lead member 15 for the negative electrode 2 does not directly face the positive electrode 1.

Accordingly, a cell having the above wound electrode member hardly reaches the thermal runaway temperature of a positive electrode, and thus does not abnormally generate heat, in a nail penetration test and a crush test. Therefore, the safety of a cell can be improved. Furthermore, if a stress is applied to the lead member 15, and the lead member 15 breaks the separator 3 and approaches the positive electrode 1 in a crush test, the direct contact of the lead member 15 to the positive electrode 1 is prevented by the positive electrode-insulating tape 16 which faces the lead member 15, and the formation of an internal short circuit is prevented. In addition, since the electrode of a wound electrode member facing the cell can substantially consists of the negative electrode 2 like the above embodiment (i), the short circuit in the outermost part is prevented, and even when a large current flows through the lead member 15 for the negative electrode 2 to locally heat the lead member 15 to a high temperature so that the separator 3 is softened and melt in a nail penetration test, a crush test and an external short-circuiting test, the formation of an internal short circuit can be prevented, since the lead member 15 for the negative electrode 2 is brought into contact only with the facing positive electrode-insulating tape 16 through the separator 3.

When the above wound electrode member is used according to the present invention, preferably the thickness of the lead member 15, which is welded to the negative electrode collector 2a, is smaller than the total of the thickness of the positive electrode-insulating tape 16 facing the lead member 15 and the thickness of the separator 3 [(positive electrode-insulating tape thickness)+(separator thickness)]. When the above thickness relationship is satisfied, it is possible to suppress the formation of an internal short circuit, even if the lead member 15 breaks the separator 3 as the crush of the cell proceeds, and then the lead member 15 is brought into contact with the positive electrode 1, in a crush test which presses the lead member 15 for the negative electrode 2 inwardly.

Figure 4:
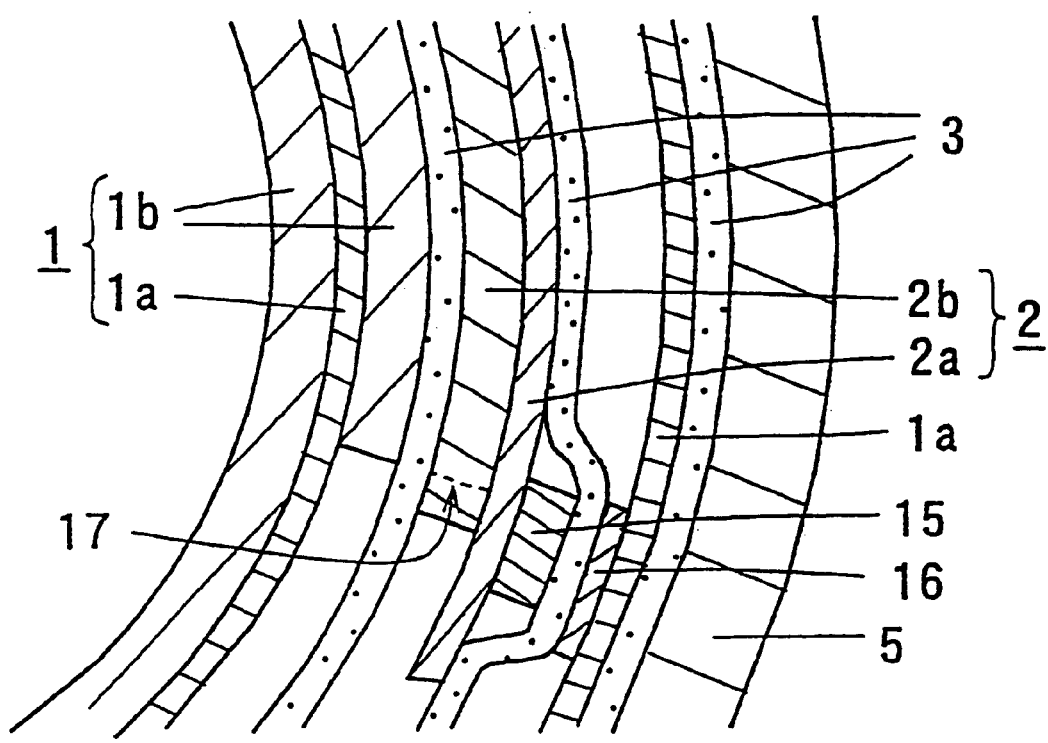
FIG. 4 is an enlarged cross section which shows the outermost part and neighboring parts of an electrode member having a wound structure used in a cell of Example 3.

The embodiment (v) of the present invention has a structure similar to the embodiment (i), in which the spirally winding positions of the positive electrode 1 and the negative electrode 2 are reversed in the wound electrode member, and thus the positive electrode faces the cell can 5. Such a wound electrode member can be used in the cell of the present invention. That is, as shown in FIG. 4, the electrode of a wound electrode member facing the cell can 5 substantially consists of the positive electrode 1, and the outer side of the positive electrode collector 1a of the positive electrode carries no coating film containing a positive electrode active material in the outermost turn, so that the uncoated or exposed surface of the positive electrode collector 1a remains. Thus, the uncoated surface faces the inner surface of the cell can 5 (as a positive electrode can in this embodiment) through the separator 3.

Contrary to the embodiment (iv), a positive electrode-insulating tape 16 is adhered to the exposed inner side of the terminal part of the positive electrode collector 1a of the positive electrode 1, which faces the lead member 15 (for a negative electrode), the lead member 15 is welded to the outer side of the negative electrode collector 2a of the negative electrode 2 in the outermost turn, and the lead member 15 faces the positive electrode-insulating tape 16 through the separator 3.

Accordingly, the above-described wound electrode member prevents the abnormal generation of heat of a cell in a nail penetration test, and also prevents the formation of an internal short circuit in a crush test, since the lead member 15 for the negative electrode 2 is brought into contact with the positive electrode-insulating tape 16 even if the lead member 15 breaks the separator 3. Furthermore, since the electrode of a wound electrode member facing the cell can 5 substantially consists of the positive electrode 1, the negative electrode is not brought into contact with the cell can 5 which functions also as a positive electrode terminal, even when the separator 3 between the cell can and the electrode member is melt. In addition, a minute short circuit due to foreign materials hardly forms. Thus, the possibility of a growth of an minute short circuit to the internal short circuit can be decreased in the crush test. Furthermore, in an external short-circuiting test, since no negative electrode 2 is included in the electrode facing the cell can 5, the formation of a continuity is prevented, and thus the local heat generation is prevented. Finally, even when the lead member 15 is heated to a high temperature and the separator 3 is softened and melts in a nail penetration test, a crush test and an external short-circuiting test, the formation of an internal short circuit is prevented since the lead member 15 for the negative electrode 2 is brought into contact only with the positive electrode-insulating tape 16.

When the cell of the present invention comprises the above wound electrode member, preferably the thickness of the lead member 15, which is welded to the negative electrode collector 2a, is smaller than the total of the thickness of the positive electrode-insulating tape 16 facing the lead member 15 and the thickness of the separator 3 [(positive electrode-insulating tape thickness)+(separator thickness)], like in the embodiment (iv).

In the case of a cell comprising the wound electrode member of the embodiment (iii), (iv) or (v), one electrode of the electrode member facing a cell can carries no coating film containing an electrode active material on both sides of the electrode collector, while the other electrode can carry a coating film containing an electrode active material only on the inner side of the other electrode and have an exposed surface on the outer side, in at least one turn, as explained in connection with the embodiment (ii). In such a structure, electrode collectors face each other at any part in at least one turn in the outermost part of the wound electrode member. Thus, the flow of a large current can be prevented, and the amount of generated heat can be decreased on the inner side in the case of internal short-circuiting, since the metal collectors having low resistance are brought into contact with each other on internal short-circuiting.

In the embodiments (ii) to (v), a distance between a lead member for a negative electrode and the position 17, at which the overlapping of a coating film containing a positive electrode active material and a coating film containing a negative electrode material starts in the outermost part of an electrode member is preferably one sixth to a half of one turn of the negative electrode in the outermost turn of the electrode member, in order to prevent the secondary internal short-circuiting in an external short-circuiting test, as explained in connection with the embodiment (i).

Figure 8:
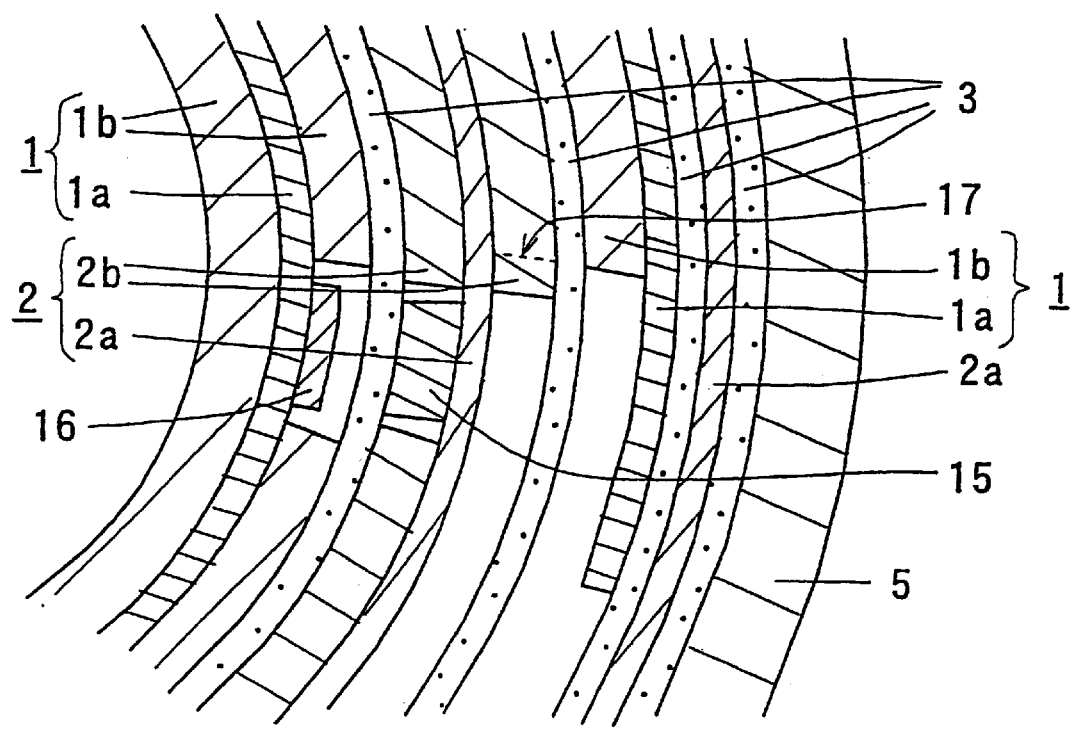
FIG. 8 is an enlarged cross section which shows the outermost part and neighboring parts of an electrode member having a wound structure used in a cell of Examples other than Examples 1, 2, 3, 5 and 6.

In the above embodiments, the lead member 15 for the negative electrode 2 is placed in the outermost turn of the negative electrode 2. However, as shown in FIG. 8, the lead member 15 for the negative electrode 2 may be placed on the negative electrode in an inner turn, insofar as the lead member 15 does not directly face the positive electrode 1.

The elements of a cell according to the present invention will be explained.

In the non-aqueous secondary cells of the present invention, an electrolyte may be any one of organic solvent base liquid electrolytes, gel-form electrolytes, and solid electrolytes. The present invention can remarkably exhibit its effects when liquid electrolytes are used.

Examples of solvents for liquid electrolytes include linear esters having a COO bond (e.g. dimethyl carbonate, diethyl carbonate, methylethyl carbonate, methyl propionate, etc.), cyclic carbonates (e.g. propylene carbonate (PC), ethylene carbonate (EC), butylene carbonate (BC), γ-butyrolactone (γ-BL), ethylene glycol sulfite (EGS), etc.), ethers (e.g. 1,2-dimethoxyethane (DME), 1,3-dioxolane, tetrahydrofuran (THF), 2-methyltetrahydrofuran (2Me-THF), diethyl ether (DEE), etc.), amine or imide organic solvents, sulfur-, fluorine-, phosphorus- or silicon-containing organic solvents, and the like.

In the present invention, a linear ester is preferably used as a major solvent of a liquid electrolyte, since the viscosity of the electrolyte decreases, and an ionic conductivity increases. A major solvent means that the amount of linear esters exceeds 50 vol. % of the whole solvents containing the linear esters. If the amount of linear esters exceeds 65 vol. %, the safety of conventional cells tends to decrease in a nail penetration test after charging the cell up to 4.4 V. However, according to the present invention, the safety of a cell can be maintained even when the amount of linear esters exceeds 65 vol. %, and the effects of the present invention are remarkably attained.

When the amount of linear esters exceeds 70 vol. %, the effects of the present invention are more remarkably attained, since the safety of conventional cells tends to deteriorate. Furthermore, when the amount of linear esters exceeds 75 vol. %, the effects of the present invention are much more remarkably attained, since the safety of conventional cells tends to further deteriorate.

Even when linear esters have a methyl group, the safety of conventional cells tends to decrease. Accordingly to the present invention, the safety of cells can be maintains when such linear esters having a methyl group are used.

When the following esters having a high dielectric constant (for example, 30 or larger) are used in combination with linear esters, the cycling and load characteristics of cells are improved in comparison with the use of only linear esters. Examples of such esters having a high dielectric constant include propylene carbonate (PC), ethylene carbonate (EC), butylene carbonate (BC), γ-butyrolactone (γ-BL), ethylene glycol sulfite (EGS), etc. Among them, cyclic esters, in particular, cyclic carbonates are preferred, and ethylene carbonate (EC) is most preferred.

The amount of esters having a high dielectric constant is preferably less than 40 vol. %, more preferably 30 vol. % or less, in particular 25 vol. % or less, of the whole solvent of an electrolyte. When the amount of such esters is 10 vol. % or more of the whole solvent of an electrolyte, the properties of cells are improved. When the amount of such esters reaches 20 vol. %, the properties of the cells are further improved.

Examples of solutes in electrolytes include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$), $LiN(RfOSO_2)_2$ in which Rf is a fluoroalkyl group, and mixtures of two or more of them. In particular, $LiPF_6$, $LiC_4F_9SO_3$, etc. are preferred, since they have good charge-discharge properties.

The concentration of a solute in an electrolyte is not limited, and usually from 0.3 to 1.7 mol/l, in particular from 0.4 to 1.5 mol/l.

The kind of a positive electrode active material is not limited. For example, metal oxides such as lithium-cobalt oxides (e.g. $LiCoO_2$, etc.), lithium-manganese oxides (e.g. $LiMn_2O_4$, etc.), lithium-nickel oxide (e.g. $LiNiO_2$, etc.), manganese dioxide, vanadium pentoxide, chromium oxide, and the like, and complex oxides based on such metal oxides (for example, different metal added products); metal sulfides such as titanium disulfide, molybdenum disulfide, and the like, can be used. Among them, lithium complex oxides, which exhibit an open circuit voltage of at least 4 V in the charging step, for example, $LiNiO_2$, $LiCoO_2$ and $LiMn_2O_4$ are preferable since a high energy density can be attained, when they are used as positive electrode active materials. In particular, $LiCoO_2$ or $LiMn_2O_4$, which is in a charged state, has the lower initiation temperature of a reaction with an electrolyte than $LiMn_2O_4$ and the like, and a cell containing $LiCoO_2$ or $LiMn_2O_4$ tends to be heated to the thermal runaway temperature of a positive electrode by the heat generation of a negative electrode. According to the present invention, the safety of a cell can be maintained even when $LiCoO_2$ or $LiMn_2O_4$ is used as a positive electrode active material. Therefore, the present invention can remarkably achieve its effects, when $LiCoO_2$ or $LiMn_2O_4$ is used as a positive electrode active material.

A positive electrode may be prepared by adding a conducting aid (e.g. flake-form graphite, carbon black, etc.) and a binder (e.g. polyvinylidene fluoride, polytetrafluoroethylene, etc.), which may be dissolved in a solvent, to the above positive electrode active material, then adding a solvent to form a paste, applying the paste containing a positive electrode active material onto a positive electrode collector made of a metal foil such as an aluminum foil, and drying the applied paste to form a coating film containing a positive electrode active material. In the present invention, no coating film containing a positive electrode active material is formed on the surface of a positive electrode collector, which constitutes the outer side of a positive electrode collector at least in the outermost turn of a wound electrode member, so that the collector surface remains uncoated.

In the present invention, the thickness of a positive electrode collector is preferably from 5 to 60 μm, in particular from 8 to 40 μm. The thickness of a coating film containing a positive electrode active material is preferably from 30 to 300 μm, in particular from 50 to 150 μm, on one surface of a collector.

The material of a negative electrode may be any material with which lithium ions can be doped and dedoped. In the present invention, such a material with which lithium ions can be doped and dedoped is called "a negative electrode active material". The kind of a negative electrode active material is not limited. Examples of a negative electrode active material include carbonaceous materials such as graphite, pyrolytic carbons, cokes, vitreous carbons, sintered materials of organic polymers, mesocarbon microbeads, carbon fiber, activated carbon, etc.; alloys of Si, Sn, In, etc.; and oxides of Si, Sn, In, etc. which can be charged and discharged at a low voltage which is close to the charge and discharge voltage of Li.

When a carbonaceous material is used as a negative electrode active material, it preferably has the following properties:

The spacing of (002) planes ($d_{002}$) is preferably 3.5 Å or less, more preferably 3.45 Å or less, in particular 3.4 Å or less. The size of a crystal in the c-axis direction (Lc) is preferably at least 30 Å, more preferably at 80 Å, in particular at least 250 Å. In addition, the average particle size of a carbonaceous material is preferably from 8 to 20 μm, in particular from 10 to 15 μm. The purity of a carbonaceous material is preferably at least 99.9 wt. %.

A negative electrode may be prepared by adding a binder (e.g. polyvinylidene fluoride, polytetrafluoroethylene, etc.), which may be dissolved in a solvent, and optionally a conducting aid to a negative electrode active material, then adding a solvent to form a paste, applying the paste containing a negative electrode active material onto a negative electrode collector made of a metal foil such as a copper foil, and drying the applied paste to form a coating film containing a negative electrode active material. In the present invention, preferably, no coating film containing a negative electrode active material is formed on the surface of a negative electrode collector, which constitutes the outer side of a negative electrode collector at least in the outermost turn of a wound electrode member so that the collector surface remains uncoated.

In the present invention, the thickness of a negative electrode collector is preferably from 5 to 60 μm, in particular from 8 to 40 μm. The thickness of a coating film containing a negative electrode active material is preferably from 30 to 300 μm, in particular from 50 to 150 μm, on one surface of a collector.

As positive and negative electrode collectors, foils, expanded metals or nets of metals such as aluminum, copper, nickel, stainless steel etc. are used. In particular, an aluminum foil is preferable as a positive electrode collector, while a copper foil is preferable as a negative electrode collector.

In the production of positive and negative electrodes, a paste containing a positive or negative electrode active material is applied onto a collector with various coating means such as an extrusion coater, a reverse roller, a doctor blade, etc.

A cell preferably has a large chargeable-dischargeable capacity per the unit volume of a wound electrode member from the viewpoint of the increase of a cell capacity. Preferably, a chargeable-dischargeable capacity at a full charge per the unit volume of a wound electrode member is at least 130 mAh/cm$^3$, more preferably at least 140 mAh/cm$^3$, in particular at least 150 mAh/cm$^3$. Cells having such a high capacity tend to abnormally generate heat. The present invention can maintain the safety of cells having such a high capacity. Thus, the present invention can remarkably attain its effects, when it is applied to cells having such a high capacity.

A lead member for a negative electrode is welded to the exposed surface of a negative electrode, which is produced as described above, by resistance welding, ultrasonic wave welding, and the like. The cross sectional area of a lead member for a negative electrode is preferably from 0.1 mm$^2$ to 1.0 mm$^2$, more preferably from 0.3 mm$^2$ to 0.7 mm$^2$ to decrease a resistance and, in turn, the amount of generated heat, in the case of the flow of a large current.

The material of a lead member for a negative electrode is usually nickel, although copper, titanium, stainless steel, etc. may be used.

A positive electrode-insulating tape, which is adhered to a positive electrode collector, is preferably an insulating tape made of polyimide, polytetrafluoroethylene, polyphenylene sulfide, etc. The thickness of a positive electrode-insulating tape is preferably from 50 to 120 μm, more preferably from 60 to 100 μm. The width of a positive electrode-insulating tape is preferably from 5 to 15 mm, more preferably from 7 to 12 mm, while it depends on the width of a facing lead member for a negative electrode.

A separator used in cells of the present invention is preferably one having sufficient strength and retaining a large amount of an electrolyte. From such a point of view, a separator is preferably made of a microporous film or non-woven fabric of polypropylene, polyethylene or ethylene-propylene copolymers, which has a thickness of 10 to 50 μm and a porosity of 30 to 70%.

The non-aqueous secondary cell of the present invention can be produced by laminating positive and negative electrodes, which are produced as described above, with inserting a separator between them, winding the laminate in a spiral form or an ellipsoid or oval form to assemble a wound electrode member, inserting the electrode member in a cell can which may be made of nickel-plated iron, stainless steel, aluminum or an aluminum alloy, and then sealing the opening of the cell can.

In general, a cell has an explosion-proof mechanism, which discharges a gas generated in the cell interior, when the gas pressure reaches a certain level, and prevents the burst of the cell under a high pressure.

With conventional non-aqueous secondary cells, dangers such as abnormal heat generation tend to increase when they are charged to 4.25 V or larger, in particular, 4.40 V or larger. However, according to the present invention, the safety of cells can be maintained in such a case. Thus, the effects of the present invention are attained remarkably in such a case. The details will be explained in Examples.

The present invention can be applied to cells having any shapes. The present invention is suitably applied to a cylindrical, cylindroidal, or box-type cell, and the like. Preferably, the minimum outer diameter of a wound electrode member in a discharged state is made 0.4 to 0.7 mm smaller than the inner diameter of a cylindrical or ellipsoidal cell. When the minimum outer diameter of a wound electrode member in a discharged state is made at least 0.4 mm smaller than the inner diameter of a cylindrical or ellipsoidal cell, the safety of a cell can be maintained even in a nail penetration test, if the cell capacity increases. The significant decrease of the cell capacity can be avoided, by making the minimum outer diameter of a wound electrode member in a discharged state 0.7 mm or less smaller than the inner diameter of a cylindrical or ellipsoidal cell. The measurement of the outer diameter of a wound electrode member will be explained in Examples.

EXAMPLES

The present invention will be illustrated by the following examples, which will not limit the scope of the invention in any way.

Example 1

$LiPF_6$ was dissolved at a concentration of 1.2 mol/l in a mixed solvent of methylethyl carbonate and ethylene carbonate in a volume ratio of 2:1 to prepare an electrolyte having a composition represented by 1.2 mol/lLiPF$_6$/EC:MEC (1:2 by volume). In this composition expression, EC and MEC are the abbreviations of ethylene carbonate and methylethyl carbonate, respectively. The above composition expression "1.2 mol/lLiPF$_6$/EC:MEC (1:2 by volume)" indicates that 1.2 mol/l of LiPF, is dissolved in a mixed solvent of methylethyl carbonate and ethylene carbonate in a volume ratio of 2:1.

Separately, flake-form graphite as a conducting aid was added to $LiCoO_2$ as a positive electrode active material in a weight ratio of 4.5:92 and mixed, and mixture was mixed with the solution of polyvinylidene fluoride in N-methylpyrrolidone to obtain a paste. The paste containing the positive electrode active material was filtrated through a 70 mesh net to remove large particles, and uniformly applied on both surfaces of a positive electrode collector made of an aluminum foil having a thickness of 15 μm, and dried to form coating films containing the positive electrode active material. In this case, the paste containing the positive electrode active material was not applied on a surface area, which would constitute the outer side of the positive electrode collector of the positive electrode in the outermost turn, when the positive electrode was spirally wound together with a negative electrode and a separator. That is, an uncoated surface, namely an exposed surface having no coating film containing a positive electrode active material was left in a length of 53 mm (about one turn).

The band-form laminate was dried and pressed to a thickness of 169 μm, and cut. Then, one end of an aluminum lead member having a width of 3 mm and a thickness of 100 μm was welded to the exposed surface of the above positive electrode collector to obtain a band-form positive electrode having the attached lead member to obtain a band-form positive electrode.

Next, a graphite carbon material (a carbon material having a 002 plane spacing ($d_{002}$) of 3.37 Å, a crystal size in the c-axis direction (Lc) of 950 Å, an average particle size of 10 μm and a purity of 99.9% or higher) as a negative electrode active material was mixed with a solution of polyvinylidene fluoride in N-methylpyrrolidone to prepare a paste. Then, the paste containing the negative electrode active material was uniformly coated on the both surfaces of a negative electrode collector made of a band-form copper foil having a thickness of 10 μm, and dried to form coating films containing the negative electrode active material. In this case, the paste containing the negative electrode active material was not applied on surfaces, which would constitute the negative electrode collector of the negative electrode in the outermost turn, when the negative electrode was spirally wound together with a positive electrode and a separator. That is, an uncoated surface, namely an exposed surface having no coating film containing a negative electrode active material was left in a length of 48 mm. The band-form laminate was dried and pressed to a thickness of 167 μm, and cut. Then, one end of a nickel lead member having a width of 3 mm and a thickness of 0.1 mm (a cross sectional area of 0.3 mm$^2$) was welded to a position which was 8 mm apart from the tip end of the exposed surface of the above negative electrode collector to obtain a band-form negative electrode.

After drying the positive and negative electrodes, the positive electrode was laminated on the negative electrode with inserting a separator made of a microporous polyethylene film having a thickness of 25 μm between them, and the laminate was spirally wound in a dry atmosphere to form a wound electrode member, which had a volume of 11.3 cm$^3$. Then, the wound electrode member was inserted in a cell can as described below to assemble a cylindrical non-aqueous secondary cell having a structure, which is schematically shown in FIG. 1. FIG. 2 shows the outermost part and neighboring essential parts of this wound electrode member.

Now, the wound electrode member shown in FIG. 2 is explained. FIG. 2 shows the outermost turn of the positive electrode 1. In the outermost turn, no coating film containing a positive electrode active material was formed on the outer side of the positive electrode collector 1a which is made of an aluminum foil, while a coating film containing a positive electrode active material 1b was formed only on the inner side of the positive electrode collector 1a. Furthermore, FIG. 2 shows the outermost and next turns of the negative electrode 2. The electrode of the wound electrode member facing the cell can 5 consisted of the negative electrode 2, and the negative electrode in the outermost turn had the exposed surfaces of the negative electrode collector 2a, and neither sides of the negative electrode collector 2a carried a coating film containing a negative electrode active material, while the negative electrode collector 2a in the second turn carried coating films 2b containing a negative electrode active material on both sides. The lead member 15 for the negative electrode 2 was attached to the inner side of the terminal part of the negative electrode collector 2a in the outermost turn. The separator 3 was inserted not only between the positive electrode 1 and the negative electrode 2, but also between the negative electrode collector 2a of the wound electrode member in the outermost turn and the inner surface of the cell can 5.

In the wound electrode member of the cell of Example 1, as shown in FIG. 2, the outer side of the positive electrode collector 1a of the positive electrode 1 in the outermost turn carried no coating film containing a positive electrode active material, but only the inner side of the positive electrode collector 1a in the outermost turn carried the coating film 1b containing a positive electrode active material The exposed part of the positive electrode collector 1a faced the exposed part of the negative electrode collector 2a through the separator 3, and the lead member 15, which was welded to the negative electrode collector 2a of the negative electrode 2 faced the coating film 2b containing a negative electrode active material of the negative electrode 2 in the next turn to the outermost turn through the separator 3 so that the lead member 15 did not directly face the positive electrode 1. A distance between the lead member 15 and the position 17, at which the overlapping of the coating film 1b containing the positive electrode active material and the coating film 2b containing a negative electrode material starts in the outermost turn of an electrode member, was one third of the outermost turn of the negative electrode. However, FIG. 2 depicts the distance between the lead member 15 and the position 17 shorter than the actual distance to avoid the excessive enlargement of the drawing.

Accordingly, the cell of Example 1 did not form an internal short circuit due to the lead member 15, which was welded to the negative electrode collector 2a, under usual service conditions.

The thickness of the lead member 15 for the negative electrode 2 was 0.1 mm (100 $\mu$m), that of the negative electrode 2 was 167 $\mu$m, and that of the separator 3 was 25 $\mu$m. Thus, the thickness of the lead member welded to the negative electrode collector 2a was smaller than the total of the thickness of the negative electrode 2 and the three times of the thickness of the separator 3 [(thickness of negative electrode 2)+3×(thickness of separator 3)]. Thus, even if this cell were forcedly crushed in a crush test, the lead member 15 welded to the negative electrode collector 2a would not press the negative electrode 2 in the next turn to the outermost turn, and therefore the coating film 2b containing the negative electrode active material would not break the separator 3 and touch the positive electrode 1 to cause an internal short circuit. In addition, if the separator 3 near the lead member 15 was softened and melted and then the lead member 15 broke the separator 3 in a nail penetration test, a crush test and an external short-circuiting test, the lead member would be brought into contact only with the negative electrode 2 in an inner turn. Thus, no internal short circuit would be formed. Furthermore, the formation of a secondary internal short circuit could be prevented, since the distance between the lead member 15 and the position 17, at which the overlapping of the coating film 1b containing the positive electrode active material and the coating film 2b containing a negative electrode material starts in the outermost part of an electrode member, was one third of the outermost turn of the negative electrode. In addition, the electrode of the wound electrode member facing the cell can 5 consisted of the negative electrode, the positive electrode 1 faced the cell can 5, which functioned as a negative electrode terminal, through the negative electrode 2. Therefore, if the separator between the electrode member and the cell can were melt and broken in a crush test or an external short-circuiting test, no internal short circuit would be formed by the contact of the positive electrode 1 to the cell can, minute short circuits would hardly be formed due to foreign materials between the electrode member and the cell can 15 and thus the possibility of the growth of the minute short circuits to internal short circuits in a crush test could be reduced. Since the electrode facing the cell can included no positive electrode, the formation of the continuity was prevented, so that the local heat generation could be avoided. The wound electrode member of the cell produced in Example 1 could have a high capacity, since the coating film 1b containing the positive electrode active material of the positive electrode 1 always faced the coating film 2b containing the negative electrode active material of the negative electrode 2 through the separator 3.

Now, a non-aqueous secondary cell comprising the above-produced wound electrode member is explained.

Such a cell was produced as follows:

The wound electrode member was inserted in a cell can having a bottom and an outer diameter of 17.87 mm, and the free end of the lead member 15 for the negative electrode 2 was welded to the inner bottom surface of the cell can, while the free end of a lead member for the positive electrode 1 was welded to a sealing plate. Then, an electrolyte was poured in the cell can so that the electrolyte sufficiently permeated the separator, and so on. Then, the opening of the cell was shielded, and the cell was precharged and aged to obtain a cylindrical non-aqueous secondary cell, the structure of which is schematically shown in FIG. 1.

The discharge capacity of this cell per the unit volume of the wound electrode, which was measured under standard service conditions, was 138 mAh/cm$^3$. The standard service conditions are as follows:

A cell is charged at 1,700 mA up to 4.2 V, then charged at a low voltage of 4.2 V fours, and discharged at 340 mA to 2.75 V.

After discharging at 1,700 mA to 2.75 V, the cell was disassembled in a dry box, washed with dimethyl carbonate, wiped and dried. Thereafter, the outer diameter of the wound electrode member was measured with Laser Scan Micrometer LS-50407 (manufacture by KEYENCE). The minimum outer diameter was 16.9 mm. Thus, the difference of the minimum outer diameter and the inner diameter of the cell can was 0.5 mm.

Here, the general structure of the above cell is explained by making reference to FIG. 1. FIG. 1 schematically shows the arrangement of the wound electrode and other elements, and serves to explain the functions of elements other than the wound electrode member. Thus, FIG. 1 does not accurately represent the structure of the wound electrode member, the structure of which is accurately shown in FIG. 2.

In FIG. 1, numerals 1 and 2 stand for the above-produced band-form positive and negative electrodes, respectively. However, FIG. 1 does not depict the metal foils as electrode collectors, which were used in the production of the positive electrode 1 and the negative electrode 2, to avoid the complication of the drawing. The positive electrode 1 and the negative electrode 2 are spirally wound with interposing the separator 3 between them, and the wound electrode member is contained in the cell can 5 together with the electrolyte 4.

The cell can 5 is made of stainless steel and functions also as a negative electrode terminal. The insulator 6 made of polypropylene is placed on the bottom of the cell can 5 prior to the insertion of the wound electrode member.

The sealing plate 7 is made of aluminum and of a disc shape. It has the thin-wall part 7a at its center, and also a pore as the pressure-inlet 7b around the thin-wall part 7a, which allows the internal pressure in the cell to act on the explosion-proof valve 9. The projection 9a of the valve 9 is welded to the upper surface of the thin-wall part 7a to form the welded part 11. In FIG. 1, only the cross sections of the thin-wall part 7a of the sealing plate and the projection 9a of the valve 9 are drawn, but their contours behind the cross sections are not drawn for the purpose of easy understanding of the drawing. The welded part 11 between the thin-wall part 7a of the sealing plate 7 and the projection 9a of the valve 9 is exaggeratively drawn in comparison with the actual part for the purpose of easy understanding.

The terminal plate 8 is made of a rolled steel plate, the surface of which is plated with nickel, and of a hat-shape having a brim around its periphery, and has the gas outlets 8a.

The explosion-proof valve 9 is made of aluminum and of a disc shape, and has a projection 9a which has a pointed end at its center on the power-generation unit side (the lower side in FIG. 1), and the lower side of the projection 9a is welded to the upper surface of the thin-wall part 7a of the sealing plate 7 to form the welded part 11, as described above.

The insulation packing 10 is made of polypropylene and of an annular shape, and it is placed on the upper side of the peripheral part of the sealing plate 7. On the insulating packing 10, the explosion-proof valve 9 is placed, and the insulation packing 10 insulates the sealing plate 7 and the valve 9, and seals the gap between them to prevent the leakage of the electrolyte.

The PTC device 18 is provided between the explosion-proof valve and the terminal plate 8. The PTC device will have an infinite resistance when a large current flows therethrough due to the formation of an external short circuit or the like, and prevent the flow of a large current through the inside of the cell.

The annular gasket 12 is made of polypropylene. The lead member 13 is made of aluminum, and connects the sealing plate 7 and the positive electrode 1. The insulator 14 is placed over the wound electrode member. The negative electrode 2 and the bottom of the cell can 5 are connected each other with the lead member 15, which is made of nickel.

As explained above, the insulator 6 is placed on the bottom of the cell can 5, and the wound electrode member, which comprises the positive electrode 1, the negative electrode 2 and the separator 3, the electrolyte 4, the insulator 14 over the electrode member, and the like are fit in the cell can 5. After fitting them in the cell can, an annular groove, the bed of which protrudes inwardly, is formed near the opening of the cell can. Then, the annular gasket 12, to which the sealing plate 7, the insulation packing 10, the explosion-proof valve 9, etc. are inserted, is fitted, and the terminal plate 8 is inserted. Thereafter, the part of the cell can 5 above the groove is inwardly squeezed to close the opening of the cell can 5. In the course of assembling the cell as described above, it is preferable to connect the negative electrode 2 and the cell can 5 with the lead member 15, and connect the positive electrode 1 and the sealing plate 7 with the lead member 13, in advance.

In the cell which is assembled as described above, the positive electrode 1 is electrically connected with the terminal plate 8 through the lead member 13, the sealing plate 7, the explosion-proof valve 9 and the welded part 11, and normally function as an electrical path, since the thin-wall part 7a of the sealing plate 7 is brought into contact with the projection 9a of the explosion-proof valve 9 through the welded part 11, the periphery of the explosion-proof valve 9 is brought into contact with the periphery of the terminal plate 8, and the positive electrode 1 is connected with the sealing plate 7 with the lead member 13 for the positive electrode.

When the cell abnormally functions and the gas generated in the cell increases the internal pressure of the cell, the increased internal pressure deforms the center part of the explosion-proof valve 9 in the direction of the internal pressure (the upward direction in FIG. 1), and thus the shear force is applied to the thin-wall part 7a which is integrated with the valve 9 at the welded part 11 to break the thin-wall part 7a, or the projection 9a of the valve 9 and the thin-wall part 7a of the sealing plate 7 are separated at the welded part 11. Accordingly, the thin-wall part 9b formed in the explosion-proof valve 9 is ruptured, and then the gas is vented outside the cell through the gas outlet 8a of the terminal plate 8 so that the blowout of the cell is prevented.

Example 2

A wound electrode member was produced and then a non-aqueous secondary cell was assembled by the same methods as those in Example 1, except that the length of an exposed part on the outer side of the positive electrode of the wound electrode member in the outermost turn, that is, the part of a positive electrode collector having no coating film containing a positive electrode active material, was changed to 70 mm, a polyphenylene sulfide tape having a width of 10 mm and a thickness of 80 $\mu$m as a positive electrode-insulating tape was adhered to the above outer side of the positive electrode in the outermost turn so that the positive electrode-insulating tape faced a lead member welded to a negative electrode through a separator, and the coated length of the outer side of the negative electrode was shortened by 20 mm.

FIG. 3 schematically shows the outermost part and neighboring essential parts of the wound electrode member of the cell produced in Example 2.

As shown in FIG. 3, in the wound electrode member of the cell produced in Example 2, the electrode of the electrode member facing the cell can 5 consisted of the negative electrode 2. The positive electrode 1 carried the coating film 1b containing the positive electrode active material only on the inner side. A polyphenylene sulfide tape having a width of 10 mm and a thickness of 80 $\mu$m as the positive electrode-insulating film 16 was adhered to the uncoated part on the outer side of the positive electrode 1 in the outermost turn, that is, the exposed part of the positive electrode collector 1a (carrying no coating film containing a positive electrode active material), and faced the lead member 15 welded to the negative electrode collector 2a through the separator 3. A distance between the lead member 15 and the position 17, at which the overlapping of the coating film 1b containing the positive electrode active material and the coating film 2b containing a negative electrode material starts in the outermost part of an electrode member, was one fourth of the outermost turn of the negative electrode. However, FIG. 3 depicts the distance between the lead member 15 and the position 17 shorter than the actual distance to avoid the excessive enlargement of the drawing.

Accordingly, the cell of Example 2 did not form an internal short circuit due to the lead member 15 welded to the negative electrode collector 2a under usual service conditions.

The thickness of the lead member 15 for the negative electrode 2 was 0.1 mm (100 μm), that of the positive electrode-insulating tape 16 was 80 μm, and that of the separator 3 was 25 μm. Thus, the thickness of the lead member welded to the negative electrode collector 2a was smaller than the total of the thickness of the positive electrode-insulating tape 16 and the thickness of the separator 3. Thus, even if this cell were forcedly crushed in a crush test, no internal short circuit would be formed.

If the lead member 15 were heated to a high temperature so that the separator 3 near the lead member 15 were softened and melt, and thus the lead member 15 broke the separator 3, no internal short circuit would be formed since the lead member would be brought into contact only with the positive electrode-insulating tape 16 inside. The formation of a secondary internal short circuit could also be avoided, since the distance between the lead member 15 and the position 17, at which the overlapping of the coating film 1b containing the positive electrode active material and the coating film 2b containing a negative electrode material starts in the outermost part of an electrode member, was one fourth of the outermost turn of the negative electrode. In addition, since the electrode of the electrode member facing the cell can consisted of the negative electrode 2, even if the separator 3 between the electrode member and the cell can 5 was melted and broken, the positive electrode 1 would not be brought into contact with the cell can 5 which functions also as a negative electrode terminal, minute short circuits would hardly be formed due to foreign materials and thus the possibility of the growth of the minute short circuits to internal short circuits in a crush test could be reduced. Since the electrode facing the cell can included no positive electrode, the formation of the continuity was prevented, so that the local heat generation could be avoided.

The discharge capacity of the cell per the unit volume of the wound electrode member under the standard service condition was measured, and it was 138 mAh/cm$^3$. After discharging at 1,700 mA to 2.75 V, the cell was disassembled, and then, the outer diameter of the wound electrode member was measured by the same way as in Example 1. The minimum outer diameter was 16.9 mm. Thus, the difference of the minimum outer diameter and the inner diameter of the cell can was 0.5 mm.

Example 3

Different from the cells of Examples 1 and 2, in the cell of Example 3, the outermost turn of the wound electrode member consisted of the positive electrode, which faced the cell can, the positive electrode in the outermost turn consisted of the positive electrode collector 1a as shown in FIG. 4, the uncoated part of the positive electrode collector had a length of 48 mm, the uncoated part on the outer side of the positive electrode collector faced the cell can 5 (a positive electrode can in Example 3) through the separator 3, and the exposed part on the outer side of the negative electrode collector 2a in the outermost turn of the negative electrode 2 had a length of 53 mm.

Like the cell of Example 2, a polyphenylene sulfide tape having a width of 10 mm and a thickness of 80 μm as the positive electrode-insulating tape 16 was adhered to the inner side of the positive electrode collector 1a in the outermost turn. The lead member 15 made of nickel having a width of 3 mm and a thickness of 0.1 mm (100 μm) was welded to the terminal part of the negative electrode collector in the outermost turn. The lead member 15 faced the positive electrode-insulating tape 16 through the separator 3.

A distance between the lead member 15 and the position 17, at which the overlapping of the coating film 1b containing the positive electrode active material and the coating film 2b containing a negative electrode material starts in the outermost part of an electrode member, was one fourth of the outermost turn of the negative electrode. However, FIG. 4 also depicts the distance between the lead member 15 and the position 17 shorter than the actual distance to avoid the excessive enlargement of the drawing.

Accordingly, the cell of Example 3 comprising the wound electrode member of FIG. 4 did not form an internal short circuit due to the lead member 15 welded to the negative electrode collector 2a under usual service conditions.

The thickness of the lead member 15 welded to the negative electrode collector 2a was 0.1 mm (100 μm), that of the positive electrode-insulating tape 16 was 80 μm, and that of the separator was 25 μm. Thus, the thickness of the lead member for the negative electrode 2 was smaller than the total of the thickness of the positive electrode-insulating tape 16 and the thickness of the separator 3. Therefore, even if this cell were forcedly crushed in a crush test, no internal short circuit would be formed.

The formation of a secondary internal short circuit could also be avoided, since the distance between the lead member 15 and the position 17, at which the overlapping of the coating film 1b containing the positive electrode active material and the coating film 2b containing a negative electrode material starts in the outermost part of an electrode member, was one fourth of the outermost turn of the negative electrode. In addition, since the electrode of the electrode member facing the cell can consisted of the positive electrode 1 and thus the negative electrode 2 faced the cell can 5, which functions also as the positive electrode terminal, through the positive electrode 1, no internal short circuit was formed by the contact of the negative electrode 2 and the cell can 5, even if the separator 3 between the electrode member and the cell can 5 was melted and broken. In addition, minute short circuits would hardly be formed due to foreign materials and thus the possibility of the growth of the minute short circuits to internal short circuits in a crush test could be reduced. Since the electrode facing the cell can 5 included no negative electrode 2, the formation of the continuity was prevented, so that the local heat generation could be avoided.

Figure 5:
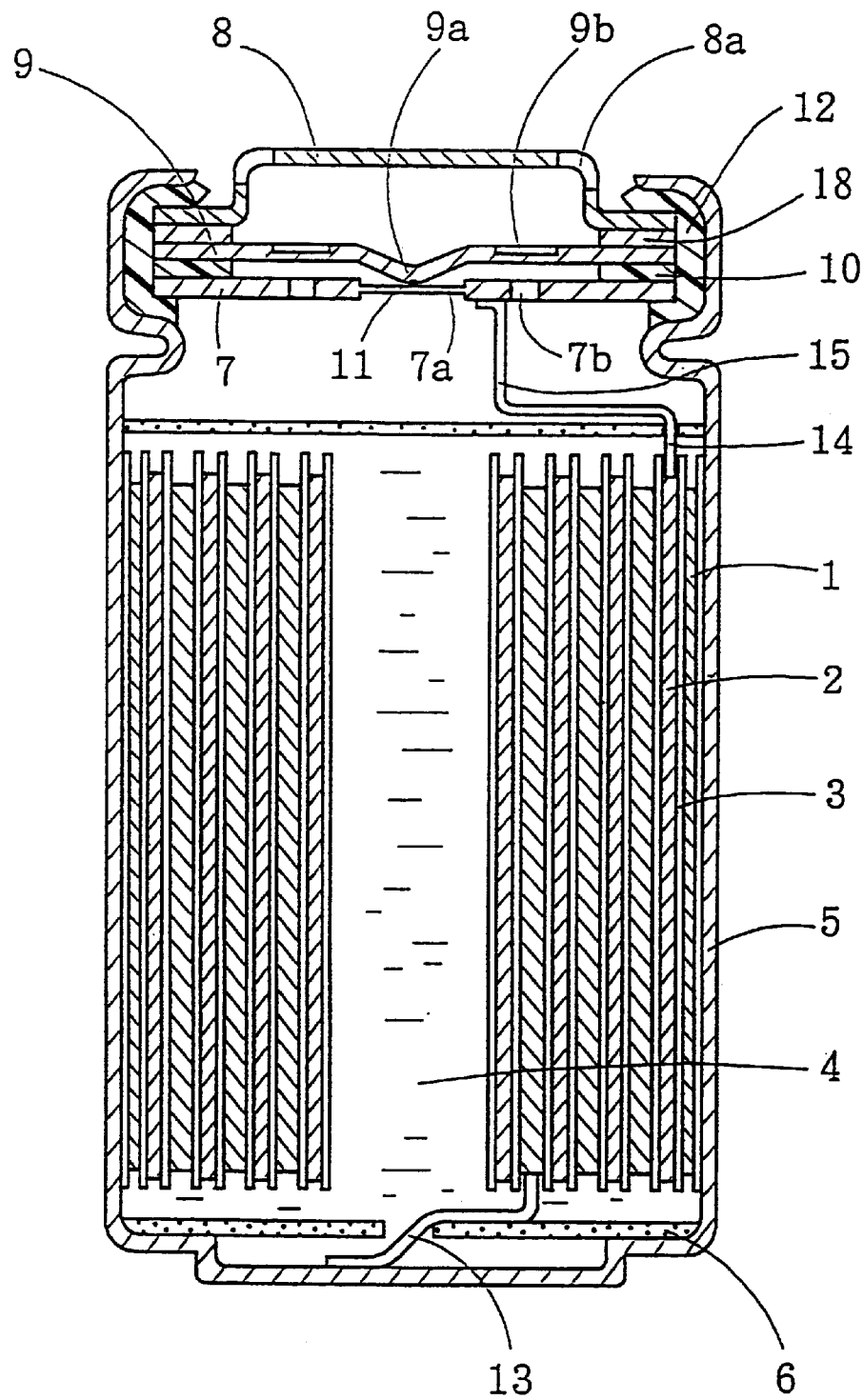
FIG. 5 is a vertical cross section which schematically shows the structure of a cell of Example 3.

FIG. 5 schematically show the structure of the non-aqueous secondary cell of Example 3.

In the cell of Example 3, the electrode of the electrode member facing the cell can consists of the positive electrode 1, and the cell can 5 is connected with the positive electrode 1 with the lead member 13 and thus functions as a positive electrode terminal. That is, the cell can 5 of the cell of Example 3 is a positive electrode can.

The sealing plate 7 and the negative electrode 2 are connected with the lead member 15, and the terminal plate 8 is connected with the sealing plate 7 through the explosion-proof valve 9 and its welded part 11, and thus functions as a negative electrode terminal. The cell of Example 3 has substantially the same structure as that of the cell of Example 1, except the above differences.

The discharge capacity of the cell per the unit volume of the wound electrode member under the standard service condition was measured, and it was 132 mAh/cm$^3$. After discharging at 1,700 mA to 2.75 V, the cell was disassembled, and then, the outer diameter of the wound electrode member was measured by the same way as in Example 1. The minimum outer diameter was 17.1 mm.

Thus, the difference of the minimum outer diameter and the inner diameter of the cell can was 0.3 mm.

Example 4

An electrode member, the essential part of which is shown in FIG. 4, was produced in the same manner as in Example 3, except that a nickel lead member having a width of 3 mm and a thickness of 0.2 mm (cross sectional area of 0.6 mm$^2$) was used as a lead member for a negative electrode, an electrode member had a cylindroid shape, and a box-shaped cell can having no PTC device was used. Then, a non-aqueous secondary cell shown in FIG. 9 was assembled.

A distance between the lead member 15 and the position 17, at which the overlapping of the coating film 1b containing the positive electrode active material and the coating film 2b containing a negative electrode material starts in the outermost part of an electrode member, was one third of the outermost turn of the negative electrode. In this Example, the drawing also depicts the distance between the lead member 15 and the position 17 shorter than the actual distance to avoid the excessive enlargement of the drawing.

Figure 9A:
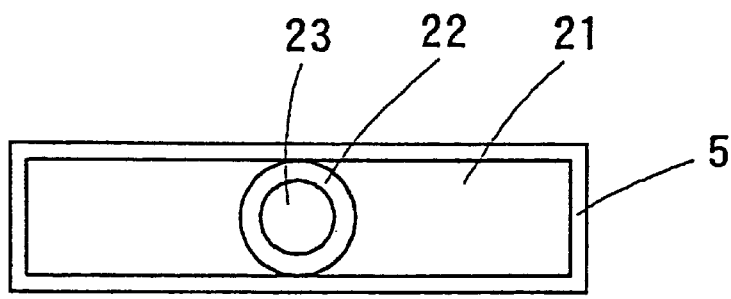
FIG. 9A is a plan view of such a cell.
Figure 9B:
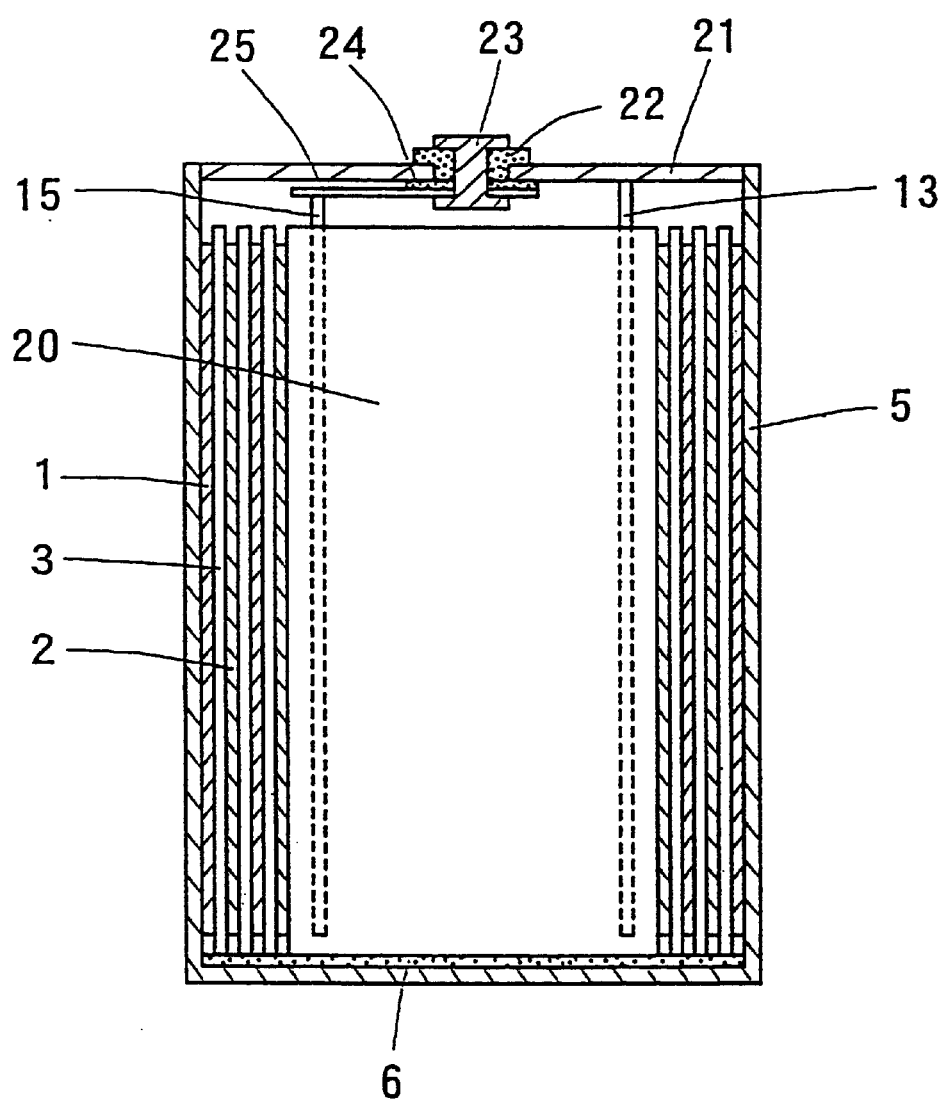
FIG. 9B is a partial cross section of such a cell.

The cell shown in FIG. 9 will be explained.

The positive electrode 1 and the negative electrode 2 are spirally wound with inserting the separator 3 between them to form an ellipsoidal electrode member 20, which is contained in the box-shaped cell can 5 together with an electrolyte. FIG. 9 does not depict electrode collectors, which were used in the production of the positive electrode 1 and the negative electrode 2, to avoid the complication of the drawing.

The cell can 5 is made of an aluminum alloy and used as the exterior case of a cell, and it also functions as a positive electrode terminal.

An insulator 6 made of a polytetrafluoroethylene sheet is placed on the bottom of the cell can 5, and the lead member 13 for the positive electrode 1 and the lead member 15 for the negative electrode 2 are connected with the positive electrode 1 and the negative electrode 2, respectively and extend from the ellipsoidal wound electrode member 20 consisting of the positive electrode 1, the negative electrode 2 and the separator 3.

The terminal 23 made of stainless steel is attached to the cover plate 21 made of an aluminum alloy, which seals the opening of the cell can 5, with inserting the insulation packing 22 made of polypropylene between them, and the lead plate 25 made of stainless steel is attached to the terminal 23 through the insulator 24.

The cover plate 21 is fit in and welded to the opening of the cell can 5 to close the opening of the cell can 5. Thus, the internal space of the cell is sealed.

In the cell of Example 4, the leadmember 13 for the positive electrode 1 is directly welded to the cover plate 21, and thus the cell can 5 and the cover plate 21 together function as a positive electrode terminal, while the lead member 15 for the negative electrode 2 is welded to the lead plate 25 to establish a continuity between the lead member 15 for the negative electrode 2 and the terminal 23 through the lead plate 25, and thus the terminal 23 functions as a negative electrode terminal.

The discharge capacity of the cell of Example 4 per the unit volume of the wound electrode member under the standard service condition was measured in the same way as Example 1, and it was 132 mAh/cm$^3$.

Example 5

A non-aqueous secondary cell was produced in the same manner as in Example 1 except that a lead member for a negative electrode was placed on the outer side of the negative electrode in the outermost turn, the length of an exposed part of the negative electrode in the outermost turn was shortened by 10 mm, and the length of the outer side part carrying a coating film containing a negative electrode active material was shortened by 20 mm.

In the wound electrode member of the cell produced in Example 5, as shown in FIG. 6, the electrode of the wound electrode member facing the cell can consisted of the negative electrode 2, the outermost turn of the negative electrode 2 had the exposed part of the negative electrode collector 2a, the outer side of the positive electrode collector 1a of the positive electrode 1 in the outermost turn carried no coating film containing a positive electrode active material, while the inner side of the positive electrode collector 1a carried a coating film containing a positive electrode active material.

The part of the positive electrode collector 1a carrying no coating film containing a positive electrode active material faced the exposed part of the negative electrode collector 2a of the negative electrode 2 through the separator 3, and the lead member 15, which was welded to the negative electrode collector 2a of the negative electrode 2, faced the cell can 5 (a negative electrode can in Example 5) through the separator 3, but did not directly face the positive electrode 1. A distance between the lead member 15 and the position 17, at which the overlapping of the coating film 1b containing the positive electrode active material and the coating film 2b containing a negative electrode material starts in the outermost part of an electrode member, was one fifth of the outermost turn of the negative electrode, since the exposed part of the negative electrode was shortened by 10 mm. However, FIG. 6 also depicts the distance between the lead member 15 and the position 17 shorter than the actual distance to avoid the excessive enlargement of the drawing.

Accordingly, the cell of Example 5 did not form an internal short circuit due to the lead member 15 welded to the negative electrode collector 2a under usual service conditions. No internal short circuit would be formed even if the cell were forcedly crushed in a crush test, since the lead member 15 faced the cell can 5 which functioned also as a negative electrode terminal.

If the lead member 15 were heated to a high temperature so that the separator 3 near the lead member 15 were softened and melt, and thus the lead member 15 broke the separator 3, no internal short circuit would be formed since the lead member would be brought into contact only with the cell can 5. The formation of a secondary internal short circuit could also be avoided, since the distance between the lead member 15 and the position 17, at which the overlapping of the coating film 1b containing the positive electrode active material and the coating film 2b containing a negative electrode material starts in the outermost part of an electrode member, was one fifth of the outermost turn of the negative electrode. In addition, since the electrode of the electrode member facing the cell can consisted of the negative electrode 2, and thus the positive electrode 1 faced the cell can functioning also as the negative electrode terminal through the negative electrode 2, even if the separator 3 near the lead member 15 for the negative electrode facing the cell can 5 were melt and broken, the positive electrode 1 would not be brought into contact with the cell can 5, minute short circuits would hardly be formed due to foreign materials and thus the possibility of the growth of the minute short circuits to internal short circuits in a crush test could be reduced. Since the electrode facing the cell can 5 included no positive electrode, the formation of the continuity was prevented, so that the local heat generation could be avoided.

The discharge capacity of the cell of Example 5 per the unit volume of the wound electrode member under the standard service condition was measured by the same method as in Example 1, and it was 138 mAh/cm$^3$. After discharging at 1,700 mA to 2.75 V, the cell was disassembled, and then, the outer diameter of the wound electrode member was measured by the same way as in Example 1. The minimum outer diameter was 16.8 mm. Thus, the difference of the minimum outer diameter and the inner diameter of the cell can was 0.6 mm.

Example 6

A wound electrode member was produced and then a non-aqueous secondary cell was assembled by the same methods as those in Example 1, except that the length of an exposed part on the outer side of the positive electrode of the wound electrode member in the outermost turn, that is, the part of a positive electrode collector having no coating film containing a positive electrode active material, was changed to 53 mm, no coating film containing a negative electrode active material was formed on either side of the negative electrode 2 in the outermost turn, and the length of the uncoated negative electrode collector 2a was changed to 80 mm, and the thickness of a lead member for a negative electrode was changed to 0.8 mm (80 μm).

FIG. 7 schematically shows the outermost part and neighboring essential parts of the wound electrode member in the cell of Example 6.

In the wound electrode member of the cell of Example 6, as shown in FIG. 7, the electrode of the electrode member facing the cell can 5 consisted of the negative electrode 2, at least one turn of the negative electrode in the outermost part consisted of the negative electrode collector 2a, and thus neither surfaces carried a coating film containing the negative electrode active material, and the negative electrode collector 2a in the next and subsequent turns to the outermost turn carried the coating film 2b containing the negative electrode active material on both sides, and the lead member 15, which was welded to the negative electrode collector 2a of the negative electrode 2, faced the negative electrode collector 2a of the negative electrode 2 in the next turn to the outermost turn so that the lead member 15 did not directly face the positive electrode 1.

FIG. 7 shows the outermost and next turns of the positive electrode 1. The positive electrode 1 in the outermost turn carried no coating film containing a positive electrode active material on its outer side, and had the exposed part of the positive electrode collector 1a in at least one turn. The exposed part of the positive electrode collector 1a faced the exposed part of the negative electrode collector 2a in at least one turn. A distance between the lead member 15 and the position 17, at which the overlapping of the coating film 1b containing the positive electrode active material and the coating film 2b containing a negative electrode material starts in the outermost part of an electrode member, was one third of the outermost turn of the negative electrode. However, FIG. 7 also depicts the distance between the lead member 15 and the position 17 shorter than the actual distance to avoid the excessive enlargement of the drawing.

Accordingly, the cell of Example 6 did not form an internal short circuit due to the lead member 15 welded to the negative electrode collector 2a under usual service conditions. In particular, in a cell having the above wound electrode member, the lead member 15 welded to the negative electrode in the outermost turn faced the negative electrode 2 in the next turn to the outermost turn, the thickness of the lead member 15 for the negative electrode 2 was 0.8 mm (80 μm), that of the negative electrode collector 2a was 10 μm, and that of the separator 3 was 25 μm, and thus the thickness of the lead member 15 for the negative electrode 2 was smaller than the total of the thickness of the negative electrode 2 and the three times of the thickness of the separators 3 [(thickness of negative electrode 2)+3×(thickness of separator 3)]. Thus, even if this cell were forcedly crushed in a crush test, the lead member 15 welded to the negative electrode collector 2a would not press the negative electrode 2 in the next turn to the outermost turn, and therefore the coating film 2b containing the negative electrode active material would not break the separator 3 and touch the positive electrode 1 to cause an internal short circuit. In addition, the heat generation due to an internal short circuit can be reduced since the active materials of positive and negative electrodes having high resistance do not face each other in one or more turns in the outermost part, and thus a short circuit is formed between the negative electrode collector 2b and the positive electrode collector 1b both having a low resistance. Furthermore, since the electrode of the wound electrode member facing the cell can 5 consisted of the negative electrode 2, the positive electrode 1 faced the cell can 5, which functioned as a negative electrode terminal, through the negative electrode 2. Therefore, if the separator between the electrode member and the cell can were melt and broken in a crush test or an external short-circuiting test, neither an internal short circuit nor a secondary short circuit would be formed by the contact of the positive electrode 1 to the cell can, minute short circuits would hardly be formed due to foreign materials between the electrode member and the cell can 5 and thus the possibility of the growth of the minute short circuits to internal short circuits in a crush test could be reduced. Since the electrode facing the cell can included no positive electrode, the formation of the continuity was prevented, so that the local heat generation could be avoided.

The discharge capacity of the cell of this Example per the unit volume of the wound electrode member under the standard service condition was measured, and it was 138 mAh/cm$^3$. After discharging at 1,700 mA to 2.75 V, the cell was disassembled, and then, the outer diameter of the wound electrode member was measured by the same way as in Example 1. The minimum outer diameter was 16.7 mm. Thus, the difference of the minimum outer diameter and the inner diameter of the cell can was 0.7 mm.

Comparative Example 1

Figure 10:
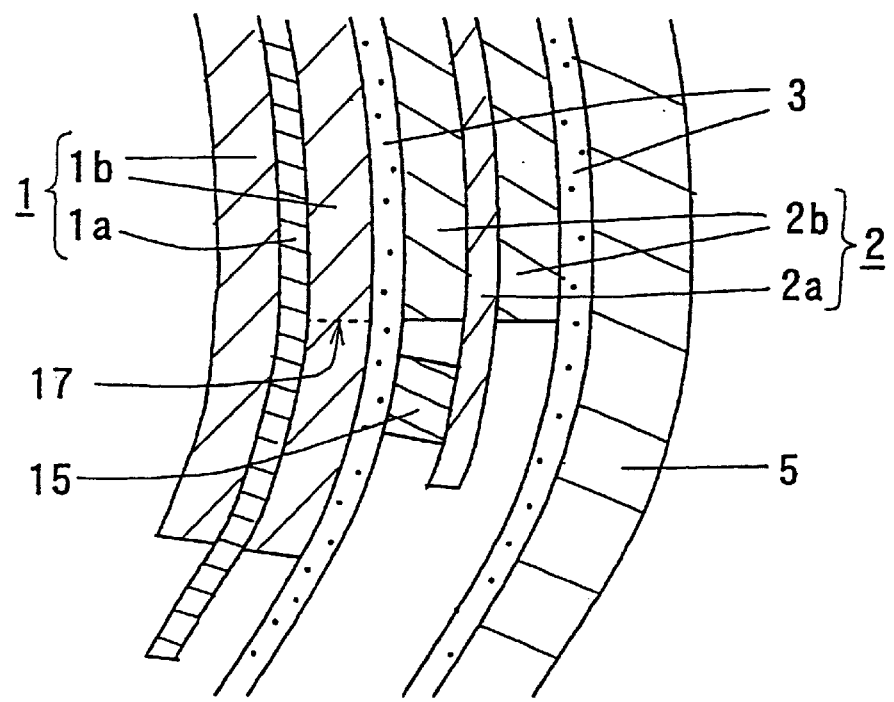
FIG. 10 is an enlarged cross section which shows the outermost part and neighboring parts of an electrode member having a wound structure used in a cell of Comparative Example 1.

A wound electrode member was produced and then a non-aqueous secondary cell was assembled by the same methods as those in Example 1, except that the uncoated part of the positive electrode collector of the positive electrode (that is, an exposed part of the positive electrode collector carrying no coating film containing a positive electrode active material on its outer side) in the outermost turn of the positive electrode was cut off at the start line of the uncoated part to the tip end to leave the part of the positive electrode collector carrying the coating film containing the positive electrode active material on both sides, while the tip end portion of the uncoated part of the negative electrode (that is, an exposed part of the negative electrode collector carrying no coating film containing a negative electrode active material) in the outermost turn of the negative electrode was cut off with leaving the part of the uncoated part with a width of 5 mm for the attachment of a lead member, the lead member having th of 4 mm and a thickness of 0.3 mm (a cross sectional area of 1.2 mm2) was welded to the inner side of the remaining uncoated part of the negative electrode collector, the length of the separator was shortened in accordance with the length of the electrodes, and the elements in the outermost part were arranged as shown in FIG. 10.

A distance between the lead member 15 and the position 17, at which the overlapping of the coating film 1b containing the positive electrode active material and the coating film 2b containing a negative electrode material starts in the outermost part of an electrode member, was one twelfth of the outermost turn of the negative electrode. However, FIG. 10 also depicts the distance between the lead member 15 and the position 17 shorter than the actual distance to avoid the excessive enlargement of the drawing.

In the wound electrode member in the cell produced in Comparative Example 1, as shown in FIG. 10, the both sides of the positive electrode collector 1a of the positive electrode 1 carried the coating films 1b containing the positive electrode active material, and the lead member 15, which was welded to the inner side of the tip end part of the negative electrode collector 2a, faced the coating film 1b containing the positive electrode active material of the positive electrode 1 through the separator 3.

Accordingly, the contact of the lead member 15 welded to the negative electrode collector 2a and the positive electrode can be prevented by the separator under usual service conditions. However, if the cell were forcedly broken, for example, in a crush test, the lead member 15 for the negative electrode broke the separator 3 to form an internal short circuit.

The discharge capacity of the cell of Comparative Example 1 per the unit volume of the wound electrode member under the standard service condition was measured, and it was 134 mAh/cm$^3$. After discharging at 1,700 mA to 2.75 V, the cell was disassembled, and then, the outer diameter of the wound electrode member was measured by the same way as in Example 1. The minimum outer diameter was 16.4 mm. Thus, the difference of the minimum outer diameter and the inner diameter of the cell can was 1.0 mm.

Comparative Example 2

A wound electrode member was produced and then a non-aqueous secondary cell was assembled by the same methods as those in Comparative Example 1, except that the length of the positive electrode collector of a positive electrode and the length of the part carrying a coating film containing a positive electrode active material were both extended by 47 mm, and the length of the negative electrode collector of a negative electrode and the length of the part carrying a coating film containing a negative electrode active material were both extended by 47 mm, and thus the length of a separator was extended by 47 mm.

The discharge capacity of the cell per the unit volume of the wound electrode member under the standard service condition was measured, and it was 150 mAh/cm$^3$. After discharging at 1,700 mA to 2.75 V, the cell was disassembled, and then, the outer diameter of the wound electrode member was measured by the same way as in Example 1. The minimum outer diameter was 17.1 mm. Thus, the difference of the minimum outer diameter and the inner diameter of the cell can was 0.3 mm.

Comparative Example 3

Figure 11:
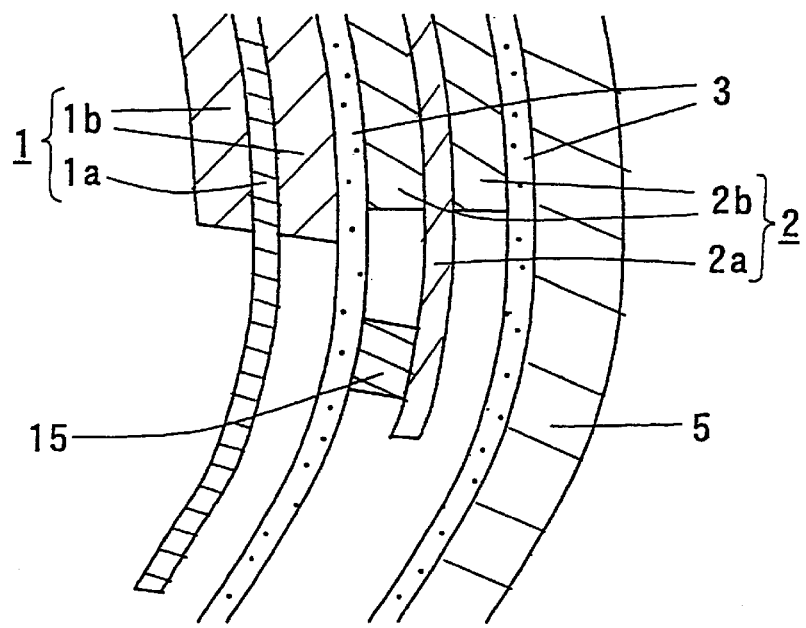
FIG. 11 is an enlarged cross section which shows the outermost part and neighboring parts of an electrode member having a wound structure used in a cell of Comparative Example 3.

A wound electrode member was produced and then a non-aqueous secondary cell was assembled by the same methods as those in Comparative Example 1, except that the length of the part consisting of a positive electrode collector in the outermost turn of a positive electrode was extended by 30 mm, and the outermost turn of the wound electrode member shown in FIG. 11 included both the positive and negative electrodes.

In the wound electrode member in the cell produced in Comparative Example 3, as shown in FIG. 11, the both sides of the positive electrode collector 1a of the positive electrode carried the coating films 1b containing the positive electrode active material, and the lead member 15, which was welded to the inner side of the tip end of the negative electrode collector 2a, faced the positive electrode collector 1a of the positive electrode 1 through the separator 3.

Accordingly, the contact of the lead member 15 welded to the negative electrode collector 2a and the positive electrode collector 1a of the positive electrode 1 can be prevented by the separator 3 under usual service conditions. However, if the cell were forcedly crushed, for example, in a crush test, the lead member 15 for the negative electrode broke the separator 3 so that the lead member 15 would be brought into contact with the positive electrode collector 1a. Thus, an internal short circuit would be formed.

The discharge capacity of the cell of Comparative Example 3 per the unit volume of the wound electrode member under the standard service condition was measured, and it was 134 mAh/cm$^3$. After discharging at 1,700 mA to 2.75 V, the cell was disassembled, and then, the outer diameter of the wound electrode member was measured by the same way as in Example 1. The minimum outer diameter was 16.5 mm. Thus, the difference of the minimum outer diameter and the inner diameter of the cell can was 0.9 mm.

After each cell produced in Examples 1–6 and Comparative Examples 1–3 was discharged to 2.75 V at 1,700 mA, it was charged at a current of 1,700 mA, and after reaching 4.25 V, it was charged for 2.5 hours while maintaining a constant voltage of 4.25 V. Then, the cell was subjected to a crush test or a nail penetration test.

In a crush test, a cell, which had been charged up to 4.25 V, was crushed under a pressure of 1 ton, and the formation of an internal short circuit was examined.

In a nail penetration test, a cell, which had been charged up to 4.25 V, was placed in a constant temperature vessel kept at 45° C. for 2 hours, and removed from the vessel. Then the cell was placed on a holder and subjected to a half nail penetration test. That is, a nail made of stainless steel having a diameter of 3 mm was penetrated into a cell to a half of the diameter, and the number of cells, which abnormally generated heat among 20 cells, was counted.

Furthermore, a cell was subjected to an external short-circuiting test. In this test, after killing the function of the PTC device 18 of the cells produced in Examples and Comparative Examples except Example 4, each cell was charged up to 4.25 V and placed in a constant temperature vessel kept at 45° C. for 2 hours. Then, the cell was forcedly short-circuited externally in the constant temperature vessel, and the number of cells, which abnormally generated heat among 20 cells, was counted.

The results are shown in Table 1, in which the dominators indicate the number of cells subjected to each test, while the numerators indicate the number of cells, which formed the internal short circuit in the crush test or abnormally generated heat in the nail penetration test and the external short-circuiting test. The abnormal heat generation means that the surface temperature of a cell reaches 150° C. or higher.

TABLE 1

|  | Ratio of cells forming short circuit in a crush test | Ratio of cells abnormally generating heat in a nail penetration test at 45° C. | Ratio of cells abnormally generating heat in an external short-circuiting test at 45° C. |
| --- | --- | --- | --- |
| Ex. 1 | 0/10 | 1/20 | 1/20 |
| Ex. 2 | 0/10 | 0/20 | 0/20 |
| Ex. 3 | 0/10 | 1/20 | 1/20 |
| Ex. 4 | 0/10 | 1/20 | 0/20 |
| Ex. 5 | 1/10 | 1/20 | 0/20 |
| Ex. 6 | 0/10 | 0/20 | 0/20 |
| C. Ex. 1 | 6/10 | 19/20 | 20/20 |
| C. Ex. 2 | 8/10 | 20/20 | 20/20 |
| C. Ex. 3 | 5/10 | 20/20 | 20/20 |

As shown in Table 1, the cells of Examples 1–6 formed fewer short circuits in the crush test, and caused less abnormal heat generation in the nail penetration test and the external short-circuiting test under the severe conditions including a temperature of 45° C., than those of Comparative Examples 1–3.

The cells of Examples 1–6 could achieve the high safety in the ½ nail penetration test, crush test and external short-circuiting test, since one turn of the positive electrode collector carried no coating film containing a positive electrode active material on its outer side, and the cross sectional area of the lead member for a negative electrode was in the range between 0.1 and 1.0 mm$^2$.

Furthermore, the cells of Examples 1–6 could achieve the high safety in the crush test, since the thickness of the lead member was smaller than the total of the thickness of the negative electrode facing the lead member and three times of the thickness of the separator [(negative electrode thickness)+(separator thickness)×3], or the total of the positive electrode-insulating tape and the thickness of the separator [(positive electrode-insulating tape thickness)+(separator thickness)].

The cells of Examples 1, 2, 4 and 5 had good heat radiation effects in the case of short-circuiting, and thus the ratio of cells which abnormally generated heat was decreased, since the outer part of the electrode member consisted of electrode collectors.

In contrast with the cells of Examples 1–6, those of Comparative Examples 1–3 easily formed the short circuit in the crush tests, and all of 20 cells abnormally generated heat in the nail penetration test at 45° C.

In particular, some of the cells of Comparative Example 2 abnormally generated heat even when the charge voltage was set at 4.25 V, and the nail penetration test was carried out at a room temperature, since the length of a part carrying a coating film was large, and the difference of the outer diameter of the wound electrode and the inner diameter of the cell can was only 0.3 mm.

The cell of Comparative Example 3 had low safety in all the tests since the coating film containing the positive electrode active material in the outermost turn of the positive electrode directly faced the coating film containing the negative electrode active material, and the outermost turn of the electrode member did not consist of a single electrode.

What is claimed is:

1. A non-aqueous secondary cell comprising an electrode member having a wound structure, in which a positive electrode having a positive electrode collector which carries coating films containing a positive electrode active material on both sides at least at a part of the collector and a negative electrode having a negative electrode collector which carries coating films containing a negative electrode active material on both sides at least at a part of the collector are wound with inserting a separator between the electrodes, and a cell can in which the electrode member is placed, wherein the electrode of the electrode member, which faces the cell can, comprises either the positive electrode or the negative electrode, the outer side of the positive electrode collector at least in the outermost part of the positive electrode in the electrode member has no coating film containing a positive electrode active material, the outer side of the positive electrode collector having no coating film containing a positive electrode active material faces the negative electrode or the inner wall of the cell can through the separator, a lead member is welded to the exposed surface of the negative electrode collector and in contact with said exposed surface in substantially the same length as the height of said electrode member, and the part of said lead member in contact with said negative electrode collector does not directly face the positive electrode through the separator only.

2. The non-aqueous secondary cell according to claim 1, wherein, in the longitudinal direction of the electrode member, the coating film containing a positive electrode active material of the positive electrode faces the coating film containing a negative electrode active material of the negative electrode through the separator, and at least one turn of the positive electrode collector carries no coating film containing a positive electrode active material on its outer side in the outermost part of the positive electrode, the lead member is welded to the exposed surface of the negative electrode and in contact with said exposed surface in substantially the same length as the height of said electrode member, and the part of said lead member in contact with said negative electrode collector faces the negative electrode or a positive electrode-insulating tape adhered to the positive electrode collector, through the separator.

3. The non-aqueous secondary cell according to claim 1, wherein the lead member welded to the negative electrode collector faces the negative electrode through the separator, and the thickness of said part of the lead member in contact with said negative electrode collector is smaller than the total of the thickness of the negative electrode facing the lead member and three times of the thickness of the separator.

4. The non-aqueous secondary cell according to claim 2, wherein the lead member welded to the negative electrode collector faces the positive electrode-insulating tape adhered to the positive electrode collector through the separator, and the thickness of said part of the lead member in contact with said negative electrode collector is smaller than the total of the thickness of the positive electrode-insulating tape and the thickness of the separator.

5. The non-aqueous secondary cell according to claim 1, wherein a distance between the lead member for the negative electrode and a position, at which the overlapping of the coating film containing the positive electrode active material and the coating film containing a negative electrode material starts in the outermost part of the electrode member is from one sixth to a half of one turn of the negative electrode in the outermost turn of the electrode member.

6. The non-aqueous secondary cell according to claim 1, wherein the lead member for the negative electrode has a cross sectional area of 0.1 mm$^2$ to 1.0 mm$^2$.

7. The non-aqueous secondary cell according to claim 1, wherein the inner side of the positive electrode collector of the positive electrode in the outermost turn of the electrode member carries the coating film containing the positive electrode active material.

8. The non-aqueous secondary cell according to claim 1, wherein the electrode of the electrode member facing the cell can functions as the same electrode as the cell can, and at least one turn of the electrode collector of said electrode carries no coating film containing an electrode active material on both sides in the outermost part of the electrode member.

9. The non-aqueous secondary cell according to claim 8, wherein at least one turn of the electrode collector of an electrode, which is different from the electrode of the electrode member facing the cell can, carries no coating film containing an electrode active material on its outer side in the outermost part of the electrode member.

10. The non-aqueous secondary cell according to claim 1, wherein a thickness of the lead member which is welded to the negative electrode collector is smaller than a total of a thickness of the negative electrode facing the lead member and three times a thickness of the separator.

11. The non-aqueous secondary cell according to claim 1, wherein a thickness of the lead member which is welded to the negative electrode collector is smaller than a total of a thickness of the negative electrode facing the lead member and a thickness of the separator.

12. The non-aqueous secondary cell according to claim 1, wherein the non-aqueous secondary cell contains an electrolyte which may be an organic solvent based liquid electrolyte, a gel-form electrolyte or a solid electrolyte.

13. The non-aqueous secondary cell according to claim 12, wherein the solvent is at least one selected form the group consisting of dimethyl carbonate, diethyl carbonate, methylethyl carbonate, methyl propionate, ethylene carbonate, butylene carbonate, γ-butyrolactone, ethylene glycol sulfite, 1,2-dimethoxyethane, 1,3-dioxolane, tetrahydrofuran, 2-methyltetrahydrofuran, and diethyl ether.

14. The non-aqueous secondary cell according to claim 12, wherein the solvent exceeds 50 volume % of linear esters.

15. The non-aqueous secondary cell according to claim 12, wherein the electrolyte contains a solute containing at least one selected from the group consisting of $LiCLO_4$, $LiPF_6$, $LiBF_4$, $LiAsF_6$, $LiCF_3SO_3$, $LiC_4F_9SO_3$, $LiCF_3CO_2$, $LiC_2F_4(SO_3)_2$, $LiN(CF_3SO_2)_2$, $LiC(CF_3SO_2)_3$, $LiC_nF_{2n+1}SO_3$ ($n \geq 2$), and $LiN(RfSO_2)_2$ in which Rf is a fluoroalkyl group.

16. The non-aqueous secondary cell according to claim 1, wherein the positive electrode active material contains at least one selected from the group consisting of $LiCoO_2$, $LiMn_2O_4$, $LiNiO_2$, manganese dioxide, vanadium pentoxide, chromium oxide, titanium disulfide, and molybdenum disulfide.

17. The non-aqueous secondary cell according to claim 1, wherein the negative electrode active material contains a carbonaceous material having a spacing of (002) planes ($d_{002}$) of about 3.5 Å or less.

18. The non-aqueous secondary cell according to claim 1, wherein a thickness of the positive electrode collector is about 5 to 60 μm.

19. The non-aqueous secondary cell according to claim 1, wherein a thickness of the negative electrode collector is about 5 to 60 μm.

20. The non-aqueous secondary cell according to claim 1, wherein the positive electrode-insulating tape has a thickness of about 50 to 120 μm.

* * * * *